United States Patent
Copeland

(10) Patent No.: US 11,468,882 B2
(45) Date of Patent: Oct. 11, 2022

(54) SEMANTIC CALL NOTES

(71) Applicant: Accenture Global Solutions Limited, Dublin (IE)

(72) Inventor: Shannon L. Copeland, Atlanta, GA (US)

(73) Assignee: Accenture Global Solutions Limited, Dublin (IE)

(*) Notice: Subject to any disclaimer, the term of this patent is extended or adjusted under 35 U.S.C. 154(b) by 55 days.

(21) Appl. No.: 16/154,718

(22) Filed: Oct. 9, 2018

(65) Prior Publication Data

US 2020/0111485 A1    Apr. 9, 2020

(51) Int. Cl.
| | | |
|---|---|---|
| G10L 15/18 | (2013.01) |
| G06Q 30/00 | (2012.01) |
| G10L 15/30 | (2013.01) |
| G10L 15/22 | (2006.01) |
| H04M 3/51 | (2006.01) |
| G06F 16/9038 | (2019.01) |
| G06F 16/903 | (2019.01) |
| G06F 40/205 | (2020.01) |

(52) U.S. Cl.
CPC ...... *G10L 15/1815* (2013.01); *G06F 16/9038* (2019.01); *G06F 16/90335* (2019.01); *G06F 40/205* (2020.01); *G06Q 30/01* (2013.01); *G10L 15/1822* (2013.01); *G10L 15/22* (2013.01); *G10L 15/30* (2013.01); *H04M 3/51* (2013.01)

(58) Field of Classification Search
CPC ............... G06Q 10/06395; H04M 3/00; G06F 17/30507; G06F 17/30; G06F 17/30654; G06F 17/277; G06F 17/28; G06N 5/00; G06N 5/04; G10L 15/1815
See application file for complete search history.

(56) References Cited

U.S. PATENT DOCUMENTS

| | | |
|---|---|---|
| 6,785,380 B2 | 8/2004 | Ribera |
| 6,829,603 B1 | 12/2004 | Chai et al. |
| 7,275,083 B1 | 9/2007 | Seibel et al. |
| 7,486,785 B2 | 2/2009 | Flores |
| 8,108,237 B2 | 1/2012 | Bourne et al. |
| 8,332,279 B2 | 12/2012 | Woolston |
| 8,411,843 B1 | 4/2013 | Cyriac |
| 9,049,295 B1 | 6/2015 | Cooper |
| 9,165,556 B1 | 10/2015 | Sugar |
| 9,848,082 B1 | 12/2017 | Lilland |
| 9,860,391 B1 | 1/2018 | Wu et al. |

(Continued)

FOREIGN PATENT DOCUMENTS

| | | |
|---|---|---|
| KR | 1020180058877 | 7/2018 |
| WO | 2016139666 A1 | 9/2016 |

OTHER PUBLICATIONS

International Search Report dated Nov. 28, 2018 for PCT/US2018/049813.

(Continued)

*Primary Examiner* — Anne L Thomas-Homescu
(74) *Attorney, Agent, or Firm* — Fish & Richardson P.C.

(57) ABSTRACT

Customer relationship management ("CRM") implemented in a computer system, including parsing a word, from call notes of a conversation between a tele-agent of a call center and a customer representative, into a parsed triple of a description logic; determining whether the parsed triple is recorded in a semantic CRM triple store of the computer system; if the parsed triple is not recorded in the semantic CRM triple store, recording the parsed triple as a call note in the semantic CRM triple store.

9 Claims, 14 Drawing Sheets

(56) References Cited

U.S. PATENT DOCUMENTS

| | | |
|---|---|---|
| 9,936,066 B1 | 4/2018 | Mammen |
| 9,942,779 B1 | 4/2018 | Proctor |
| 9,948,783 B1 | 4/2018 | Farrell |
| 10,026,092 B2 | 7/2018 | Heater et al. |
| 10,057,423 B1 | 8/2018 | Sheikh |
| 10,101,976 B2 | 10/2018 | Cavalcante |
| 10,303,466 B1* | 5/2019 | Karman .................. G06F 8/73 |
| 10,482,384 B1* | 11/2019 | Stoilos ................. G06F 16/335 |
| 10,923,114 B2 | 2/2021 | Copeland |
| 10,972,608 B2 | 4/2021 | Copeland |
| 2003/0126136 A1 | 7/2003 | Omoigui |
| 2004/0143473 A1 | 7/2004 | Fivey et al. |
| 2004/0210881 A1 | 10/2004 | Friedman |
| 2005/0005266 A1* | 1/2005 | Datig ...................... G06N 5/02 |
| | | 717/136 |
| 2005/0044357 A1 | 2/2005 | Fano |
| 2005/0105712 A1* | 5/2005 | Williams ............ H04M 3/5166 |
| | | 379/265.02 |
| 2006/0095273 A1 | 5/2006 | Montvay et al. |
| 2006/0098625 A1 | 5/2006 | King |
| 2006/0239439 A1 | 10/2006 | Blackwood |
| 2007/0019618 A1 | 1/2007 | Shaffer |
| 2007/0064913 A1 | 3/2007 | Shaffer |
| 2007/0094183 A1* | 4/2007 | Paek .................... G06F 16/334 |
| | | 706/45 |
| 2007/0233561 A1 | 10/2007 | Golec |
| 2008/0162498 A1* | 7/2008 | Omoigui ............... G06F 16/958 |
| 2008/0275744 A1 | 11/2008 | MacIntyre et al. |
| 2009/0012842 A1* | 1/2009 | Srinivasan ......... G06F 16/3344 |
| | | 707/999.005 |
| 2009/0070322 A1* | 3/2009 | Salvetti ............... G06F 16/3334 |
| 2009/0132474 A1 | 5/2009 | Ma |
| 2009/0245500 A1 | 10/2009 | Wampler |
| 2009/0271192 A1 | 10/2009 | Marquette |
| 2010/0010802 A1 | 1/2010 | Ruano |
| 2010/0036788 A1* | 2/2010 | Wu ......................... G06F 16/20 |
| | | 706/47 |
| 2010/0063799 A1* | 3/2010 | Jamieson ................ G06F 16/36 |
| | | 704/9 |
| 2010/0114563 A1* | 5/2010 | Choi ...................... G06F 40/30 |
| | | 704/9 |
| 2011/0077999 A1 | 3/2011 | Becker et al. |
| 2011/0082829 A1* | 4/2011 | Kolovski ............... G06N 5/046 |
| | | 706/55 |
| 2011/0113094 A1 | 5/2011 | Chunilal |
| 2011/0206198 A1 | 8/2011 | Freedman |
| 2011/0264451 A1 | 10/2011 | Hoepfinger |
| 2012/0059776 A1 | 3/2012 | Estes |
| 2012/0078636 A1* | 3/2012 | Ferrucci ............ G06F 16/24564 |
| | | 704/270.1 |
| 2012/0233558 A1* | 9/2012 | Naim .................... G06F 40/169 |
| | | 715/760 |
| 2012/0275642 A1* | 11/2012 | Aller .................... G06F 3/04886 |
| | | 382/100 |
| 2012/0303355 A1 | 11/2012 | Liu et al. |
| 2013/0006916 A1 | 1/2013 | McBride |
| 2013/0091090 A1 | 4/2013 | Spivack et al. |
| 2013/0163731 A1 | 6/2013 | Yan |
| 2013/0204663 A1 | 8/2013 | Kahlow |
| 2014/0022328 A1 | 1/2014 | Gechter et al. |
| 2014/0081585 A1 | 3/2014 | Cappucino |
| 2014/0081934 A1* | 3/2014 | Mizell .................. G06F 16/2228 |
| | | 707/696 |
| 2014/0122535 A1* | 5/2014 | Gerard .............. G06F 16/24522 |
| | | 707/802 |
| 2014/0156681 A1 | 6/2014 | Lee |
| 2014/0164502 A1 | 6/2014 | Khodorenko |
| 2014/0189680 A1 | 7/2014 | Kripalani |
| 2014/0201234 A1 | 7/2014 | Lee et al. |
| 2014/0270108 A1 | 9/2014 | Riahi et al. |
| 2014/0278343 A1* | 9/2014 | Tran ....................... G06F 40/53 |
| | | 704/2 |
| 2014/0314225 A1 | 10/2014 | Riahi |
| 2014/0343927 A1 | 11/2014 | Sandei |
| 2014/0372630 A1* | 12/2014 | Bostick ................ G06F 3/0659 |
| | | 710/5 |
| 2014/0379755 A1* | 12/2014 | Kuriakose ......... G06F 16/24522 |
| | | 707/780 |
| 2015/0012350 A1 | 1/2015 | Li et al. |
| 2015/0066479 A1* | 3/2015 | Pasupalak ........... G06F 16/9535 |
| | | 704/9 |
| 2015/0189085 A1 | 7/2015 | Riahi et al. |
| 2015/0201077 A1 | 7/2015 | Konig et al. |
| 2015/0242410 A1 | 8/2015 | Pattabhiraman et al. |
| 2015/0254234 A1 | 9/2015 | Dixit |
| 2015/0261743 A1* | 9/2015 | Sengupta ............. G06F 40/232 |
| | | 704/9 |
| 2015/0294405 A1 | 10/2015 | Hanson |
| 2015/0309994 A1 | 10/2015 | Liu |
| 2015/0348551 A1* | 12/2015 | Gruber ................... G10L 15/28 |
| | | 704/235 |
| 2015/0379603 A1 | 12/2015 | Gupta |
| 2016/0019882 A1 | 1/2016 | Matula |
| 2016/0021181 A1 | 1/2016 | Ianakiev et al. |
| 2016/0034457 A1* | 2/2016 | Bradley ............ G06F 16/24522 |
| | | 707/749 |
| 2016/0036981 A1 | 2/2016 | Hollenberg |
| 2016/0036982 A1 | 2/2016 | Ristock |
| 2016/0036983 A1 | 2/2016 | Korolev |
| 2016/0048854 A1 | 2/2016 | Kahlow |
| 2016/0117593 A1* | 4/2016 | London ................. G06Q 10/10 |
| | | 706/11 |
| 2016/0162474 A1 | 6/2016 | Agarwal |
| 2016/0162913 A1 | 6/2016 | Linden et al. |
| 2016/0171099 A1 | 6/2016 | Lorge et al. |
| 2016/0188686 A1* | 6/2016 | Hopkins ............... G06F 16/258 |
| | | 707/602 |
| 2016/0189028 A1 | 6/2016 | Hu |
| 2016/0217479 A1 | 7/2016 | Kashyap et al. |
| 2016/0239851 A1 | 8/2016 | Tanner |
| 2016/0321748 A1 | 11/2016 | Mahatm |
| 2016/0335544 A1 | 11/2016 | Bretschneider |
| 2016/0371724 A1 | 12/2016 | Kulpa |
| 2017/0017694 A1* | 1/2017 | Roytman ................ H04M 3/51 |
| 2017/0024375 A1* | 1/2017 | Hakkani-Tur ...... G10L 15/1822 |
| 2017/0091390 A1 | 3/2017 | Joul |
| 2017/0124193 A1* | 5/2017 | Li ......................... H04L 63/101 |
| 2017/0147635 A1* | 5/2017 | McAteer ............. G06F 16/2246 |
| 2017/0154108 A1 | 6/2017 | Li et al. |
| 2017/0177715 A1* | 6/2017 | Chang .................. G06F 40/186 |
| 2017/0200220 A1 | 7/2017 | Nicholson |
| 2017/0195488 A1 | 8/2017 | Pendyaia |
| 2017/0262429 A1* | 9/2017 | Harper ..................... G06F 40/40 |
| 2017/0262530 A1* | 9/2017 | Okura ................. G06F 16/3344 |
| 2017/0293610 A1* | 10/2017 | Tran ..................... G06Q 10/025 |
| 2018/0082183 A1 | 3/2018 | Hertz et al. |
| 2018/0115644 A1 | 4/2018 | Al-Khaja |
| 2018/0144250 A1* | 5/2018 | Kwon ..................... G06N 5/006 |
| 2018/0150459 A1* | 5/2018 | Farid ................. G06F 16/24578 |
| 2018/0288098 A1* | 10/2018 | Wang ................... G06F 16/9024 |
| 2018/0300310 A1* | 10/2018 | Shinn ..................... G06F 40/284 |
| 2018/0315000 A1* | 11/2018 | Kulkarni ............... H04W 88/16 |
| 2018/0315001 A1 | 11/2018 | Garner |
| 2018/0338040 A1 | 11/2018 | Carly |
| 2018/0365772 A1 | 12/2018 | Thompson |
| 2018/0376002 A1 | 12/2018 | Abraham |
| 2019/0042988 A1 | 2/2019 | Brown |
| 2019/0080370 A1 | 3/2019 | Copeland |
| 2019/0188617 A1 | 6/2019 | Copeland |
| 2019/0206400 A1* | 7/2019 | Cui ......................... G05D 1/0231 |
| 2019/0220794 A1 | 7/2019 | Kulkarni |
| 2019/0340294 A1* | 11/2019 | Spangler ................ G06N 5/022 |
| 2020/0042642 A1* | 2/2020 | Bakis ..................... G06F 16/951 |
| 2020/0097814 A1* | 3/2020 | Devesa ................... G10L 15/22 |
| 2020/0110835 A1* | 4/2020 | Zhao ................... G06F 16/3329 |

OTHER PUBLICATIONS

International Search Report dated Feb. 22, 2019 for PCT/US2018/065584.

(56) References Cited

OTHER PUBLICATIONS

International Search Report and Written Opinion dated Dec. 30, 2019 for related PCT/US2019/062629.
International Search Report and Written Opinion dated Jan. 9, 2020 for related PCT/US2019/055488.
International Search Report and Written Opinion dated Jan. 14, 2020 for related PCT/US2019/060174.
International Search Report and Written Opinion dated Jan. 17, 2020 for related PCT/US2019/058997.
International Search Report and Written Opinion dated Mar. 9, 2020 for related PCT/US2019/059949.
International Search Report and Written Opinion dated Apr. 1, 2020 for related PCT/US2019/055483.
Liew. "Strategic integration of knowledge management and customer relationship 1-20 management." In: Journal of Knowledge Management. Jul. 18, 2008 (Jul. 18, 2008) Retrieved on Dec. 25, 2019 (Dec. 25, 2019) from <http://student.bms.lk/GDM/49/Slides/MarManaSampleAssi/MMAsuportingJouArti/13673270810884309.pdf> entire document.
Tung. "Google's human-sounding AI to answer calls at contact centers." In: ZDNet. Jul. 25, 2018 (Jul. 25, 2018) Retrieved on Dec. 25, 2019 (Dec. 25, 2019) from <https://www.zdnet.com/article/googles-human-sounding-ai-to-answer-calls-at-contact-centers/> entire document.
Jan. 25, 2020 Office Action for related U.S. Appl. No. 15/844,512.
Mar. 5, 2020 Office Action for related U.S. Appl. No. 16/183,736.
Jan. 10, 2020 Office Action for corresponding U.S. Appl. No. 15/700,210.
Jul. 25, 2019 Office Action for related U.S. Appl. No. 16/198,742.
Final Office Action dated Jul. 27, 2020 for corresponding U.S. Appl. No. 15/844,512.
Final Office Action dated Jul. 7, 2020 for corresponding U.S. Appl. No. 15/700,210.
Non-Final Office Action dated Sep. 29, 2020 for corresponding U.S. Appl. No. 16/157,075.
Non-Final Office Action dated Sep. 30, 2020 for corresponding U.S. Appl. No. 16/911,717.
Jan. 27, 2021 Office Action for corresponding U.S. Appl. No. 15/700,210.
Feb. 25, 2021 Office Action for corresponding U.S. Appl. No. 15/844,512.
Mar. 16, 2021 Office Action for corresponding U.S. Appl. No. 16/183,725.

\* cited by examiner

SEMANTIC CALL NOTES

BACKGROUND

Customer Relationship Management ('CRM') is an approach to managing a company's interaction with current and potential customers. It uses data analysis about customers' history with a company to improve business relationships with customers, specifically focusing on customer retention and sales growth. CRM systems compile data from a range of different communication channels, including a company's website, telephone, email, live chat, marketing materials, and social media. Through the CRM approach and the systems used to facilitate it, businesses learn more about their target audiences and how to best address their needs.

Enterprise CRM systems can be huge. Such systems can include data warehouse technology, used to aggregate transaction information, to merge the information with information regarding CRM products and services, and to provide key performance indicators. CRM systems aid managing volatile growth and demand, and implement a forecasting models that integrate sales history with sales projections. CRM systems track and measure marketing campaigns over multiple networks, tracking customer analysis by customer clicks and sales. Some CRM software is available through cloud systems, software as a service (SaaS), delivered via network and accessed via a browser instead of installed on a local computer. Businesses using cloud-based CRM SaaS typically subscribe to such CRM systems, paying a recurring subscription fee, rather than purchasing the system outright.

Despite being huge systems, most CRM systems available today lack the infrastructure to properly make use of the information they can access. There is an ongoing need for CRM systems with improved infrastructure.

DETAILED DESCRIPTION OF EXAMPLE EMBODIMENTS

Figure 1:
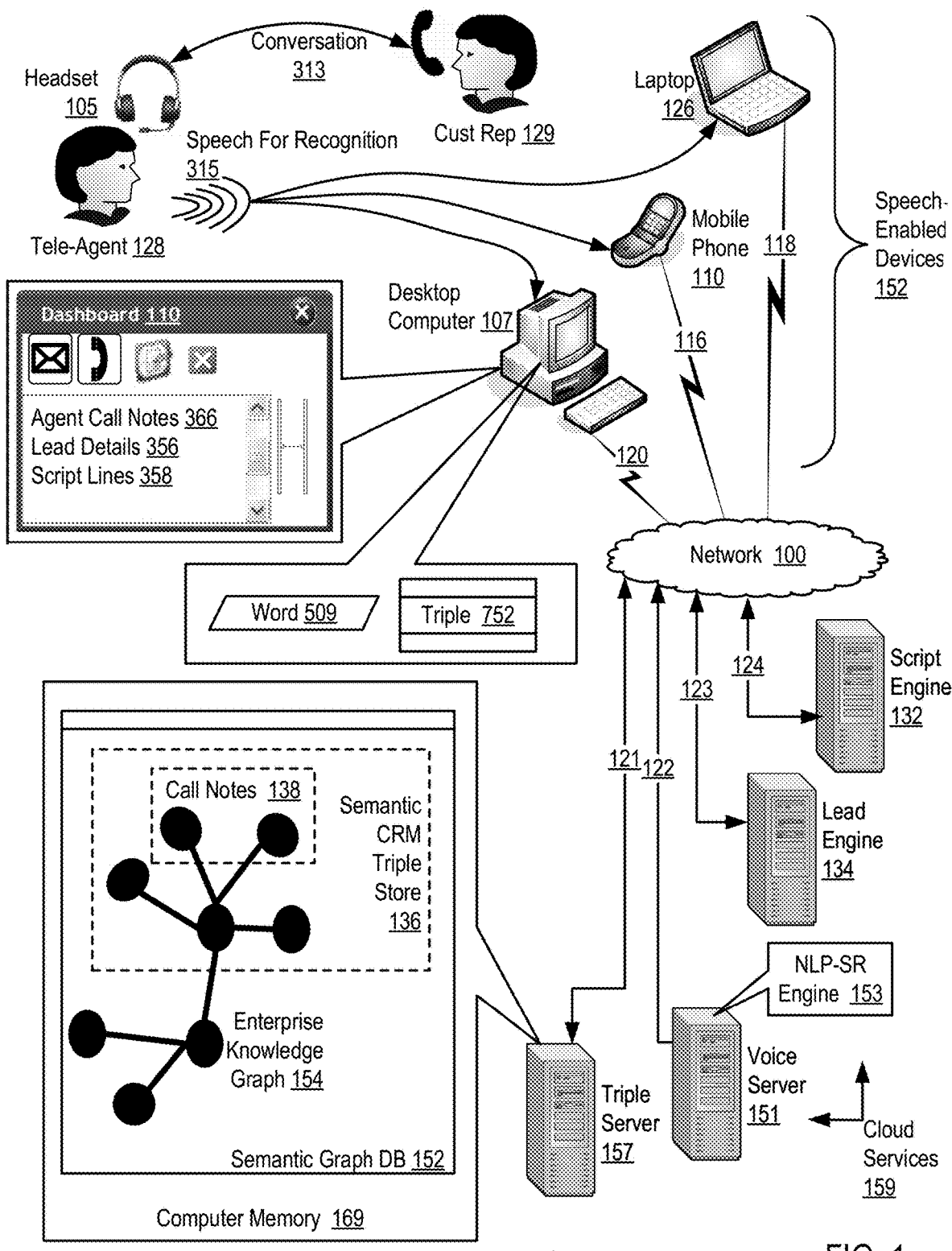
FIG. 1 sets forth a network diagram illustrating an example system for customer relationship management ("CRM") according to embodiments of the present invention.

Example methods and apparatus for customer relationship management ("CRM") implemented in a computer system are described with reference to the accompanying drawings, beginning with FIG. 1. FIG. 1 sets forth a network diagram illustrating an example computer system for CRM according to embodiments of the present invention. CRM in the example of FIG. 1 is implemented with at least one speech-enabled device (152), a triple server (157), a voice server (151), a lead engine (134), and a script engine (132). A speech-enabled device is automated computing machinery configured to accept and recognize speech from a user and express to a user voice prompts and speech responses. Speech-enabled devices in the example of FIG. 1 include a desktop computer (107), a mobile phone (110), and a laptop computer (126), any or all of which can server as a workstation for a tele-agent carrying out CRM in a call center (305). The speech-enabled devices are coupled for data communications through wireless connections (116, 118, 120) and through network (100) to the triple server (157), the voice server (151), the lead engine (134), and the script engine (132).

A lead engine (134) is automated computing machinery that gathers leads from various resources and provides them to a tele-agent through a GUI for use with customers and prospective customers. A lead is structured data representing a customer or potential customer typically including a lead ID, lead name, company, role of the lead, address of the lead or company, phone number of the lead and other relevant information as will occur to those of skill in the art. Such a lead may be implemented as a record, message, object, or other data structure useful to automated computing machinery for automatic lead generation and presentation through a GUI to a tele-agent.

A script engine (206) is automated computing machinery that creates in real-time a dynamic script for a tele-agent to use in communicating with a customer. A dynamic script is a script that changes in real-time in dependence upon various factors such as current industry trend data and often the specific products that the tele-agents supports and the products that the customer does or does not have. That is, the dynamic script is dynamic in the sense that it changes in real-time based on, for example, industry trends. The sentences in the script are dynamically reordered, added, or deleted in real-time for the benefit of conversation with the customer. Such sentences may be dynamically altered in the script by being dynamically reordered or created in real-time, retrieved from a repository of relevant industry and software descriptions, provided by other tele-agents, or in other ways as will occur to those of skill in the art.

Automated computing machinery, as that phrase is used in this specification, means a module, segment, or portion of code or other automated computing logic, hardware, software, firmware, or the like, as well as a combination of any of the aforementioned, local or remote. Automated computing machinery is often implemented as executable instructions, physical units, or other computing logic for implementing specified logical functions.

The overall example computer system illustrated in FIG. 1 operates generally to implement CRM according to embodiments of the present invention by parsing a word (509), from call notes (366) of a conversation (313) between a tele-agent (128) of a call center (305) and a customer representative (129), into a parsed triple (752) of a description logic. The overall computer system of FIG. 1 operates further by determining whether the parsed triple is recorded in a semantic CRM triple store (136) of the computer system, and, if the parsed triple (752) is not recorded in the semantic CRM triple store (136), recording the parsed triple as a call note (138) in the semantic CRM triple store. The semantic CRM triple store (136) is implemented in this example as a component of an enterprise knowledge graph (154) stored in a semantic graph database (152) in computer memory (169).

A tele-agent (128) is a person, an agent of a call center, responsible for selling or supporting commercial products and services. A customer representative (129) is a person who represents a customer, a company or other enterprise that is a current or prospective purchaser of goods or services of a call center.

A call center (305) is an organization of personnel and computer resources that provide CRM according to embodiments of the present invention. In the example of FIG. 1, a dotted line indicates the extent of the call center (305). The extent is logical rather than physical. All of the resources and personnel that make up the call center can have the same physical location, or the call center can be highly virtualized, with separate physical locations for tele-agents and for servers, for example. All or some of the tele-agents can work from home offices. Script and lead engines may be located in data centers separate from data centers that house triple servers and voice servers. And so on.

A semantic graph database (152) is a database that uses graph structures for semantic queries with nodes, edges and properties to represent and store data. A key concept of this database system is the graph (or edge or relationship), which directly relates data items in a data store. The relationships allow data in the store to be linked together directly, and in many cases retrieved with one operation.

Such a graph database contrasts with conventional relational databases, where links between data are stored in the data, and queries search for this data within the store and use the join concept to collect the related data. Graph databases, by design, allow simple and fast retrieval of complex hierarchical structures that are difficult to model in relational systems.

The underlying storage mechanism of graph databases can vary. Some depend on a relational engine and store the graph data in a table. Others use a key-value store or document-oriented database for storage, making them inherently NoSQL structures.

Retrieving data from a graph database often requires a query language other than SQL, which was designed for relational databases and does not elegantly handle traversing a graph. There are a number of systems, most often tightly tied to one product and there are some multi-vendor query languages like Gremlin, SPARQL, and Cypher. In addition to having query language interfaces, some graph databases are accessed through application programming interfaces (APIs).

Graph databases are based on graph theory, and employ nodes, edges, and properties. Nodes represent entities such as people, businesses, accounts, or any other item to be tracked. They are roughly the equivalent of the record, relation, or row in a relational database, or the document in a document database. Edges, also termed graphs or relationships, are the lines that connect nodes to other nodes; they represent the relationship between them. Meaningful patterns emerge when examining the connections and interconnections of nodes, properties, and edges. Edges are the key concept in graph databases, representing an abstraction that is not directly implemented in other systems. Properties are germane information that relate to nodes. For example, if N3 were one of the nodes, it might be tied to properties such as web-services support, cloud-computing, or a word that starts with the letter N, depending on which aspects of N3 are germane to a given database.

The graph database of FIG. 1 is a semantic graph database and stored within it is an enterprise knowledge graph (154). The example enterprise knowledge graph of FIG. 1 can be, for example, implemented using the Resource Description Framework ('RDF'). In such an implementation, the enterprise knowledge graph has each data item represented by a resource identifier. Such resource identifiers may include a uniform resource identifier ('URI'), an internationalized resource identifier ('IRI'), a uniform resource locator ('URL'), a literal, a non-literal, or any other resource identifier. RDF makes resource identifier relationships between data items the central attribute of its overall data model. Resource identifiers, such as URI's, are created with data and linked together using relationships that are also named with resource identifiers.

The knowledge graph of FIG. 1 has characteristics of mathematical directed graphs in that it is composed of vertices (a.k.a. nodes) and directed edges. Each edge connects two vertices, has a type, and can have one or more properties. Each property is a key-value pair. The ability to type an edge and attach properties to it increases the semantic expressiveness of the knowledge graphs. This description of graph databases and semantic graph databases is for explanation and not for limitation. In fact, alternative embodiments may include relational databases, Non-SQL data stores, files, text documents, spreadsheets, and other viable database structures.

Computer memory (169) can include cache, random access memory ("RAM"), disk storage, and so on, most forms of computer memory. Computer memory so configured typically resides upon speech-enabled devices, or, as shown here (169), upon one or more triple servers (157).

The word (509) of digitized speech (508) is speech for recognition (315) from a conversation (313). The speech for recognition can be the entire conversation, where, for example, both persons speaking are in the same room, and the entire conversation is picked up by a microphone on a speech-enabled device. The scope of speech for recognition can be reduced by providing to a speech-enabled device only one side of the conversation, as only through a microphone on a headset (105). The scope of speech for recognition can be reduced even further by providing for recognition only speech that responds to a prompt from a VoiceXML dialogue executing on a speech-enabled device. As the scope of speech for recognition is reduced, data processing burdens are reduced across the system as a whole, although it remains an option, in some embodiments at least, to recognize the entire conversation and stream across a display (110) a flow of all words in the conversation. Speech from the conversation (313) is recognized into digitized words by operation of a natural language processing speech recognition ("NLP-SR") engine (153), shown here disposed upon a voice server (151), but also amenable to installation on speech-enabled devices. The NLP-SR engine also carries out the parsing of a word (509) of the speech so digitized (508) into a triple (752) of a description logic. In addition to digitizing the word (509) by speech recognition functions of a voice server (151), for a further example, the word (509) can be digitized by operation of widgets of a graphical user interface (110). Or, for an even further example, the word (509) can be digitized by a user's (128) typing it into a text entry box (366) of a graphical user interface (110).

The parsed triple (752) recorded as a call note (138) is a semantic triple composed of, for example, a subject, a predicate, and an object, that is 'parsed' in the sense that it is composed from elements derived from recognized speech, selections from GUI widgets, text typed through a GUI, or the like. That is, "parsing" means taking components from various sources and forming them into semantic triples. Parsing can include forming into semantic triples raw text from data entry or conversational speech that is processed by an NLP-SR engine into parts of speech. Such parts of speech can be formed into triples by placing each part appropriately as subject-predicate-object in a triple.

A semantic CRM triple store (136) is information supportive of CRM structured in semantic triples and disposed within the overall enterprise knowledge graph. The call notes triple store (138) is composed of structured definitions of words derived from tele-agents' call notes. The call notes triple store (138) is implemented as a subgraph of the semantic CRM triple store (136), which in turn is implemented as a subgraph of the overall enterprise knowledge graph. In embodiments, the enterprise knowledge graph (154) may include all or most information describing or pertinent to or useful in an entire corporate enterprise, financials, business entities and structures, employee data, incorporation data, transactions, contracts, sales history, product descriptions, and so on, and so on. Thus, CRM information is a subset of overall corporate information, and the content of call notes is a subset of CRM information. The present description of triple stores as subgraphs of an overall enterprise knowledge graph is for explanation rather than limitation. In some embodiments at least, for various reasons, CRM data or call note data can be implemented in separate graphs rather than subgraphs. In the example of FIG. 1, the enterprise knowledge graph (154), the semantic CRM triple store (136), and the call notes triple store (138) are all implemented in semantic triples organized and connected according to at least one form of semantic logic, such as, for example, a predicate logic or a description logic.

A triple (752) is a three-part statement expressed in a form of logic. Depending on context, different terminologies are used to refer to effectively the same three parts of a statement in a logic. In first order logic, the parts are called constant, unary predicate, and binary predicate. In the Web Ontology Language ("OWL") the parts are individual, class, and property. In some description logics the parts are called individual, concept, and role. In this paper, the elements of a triple are referred to as subject, predicate, and object—and expressed like this: <subject> <predicate> <object>—or like this: (subject predicate object). There are many modes of expression for triples. Elements of triples can be represented as Uniform Resource Locaters ("URLs"), Uniform Resource Identifiers ("URIs"), or International Resource Identifiers ("IRIs"). Triples can be expressed in N-Quads, Turtle syntax, TriG, Javascript Object Notation or "JSON," the list goes on and on. The expression used here, subject-predicate-object in angle brackets or parenthesis, is a form of abstract syntax, optimized for human readability rather than machine processing, although its substantive content is correct for expression of triples. Using this abstract syntax, here are examples of triples:

<Bob> <is a> <person>
    <Bob> <is a friend of> <Alice>
    <Bob> <is born on> <the $4^{th}$ of July 1990>
    <Bob> <is interested in> <the Mona Lisa>
    <the Mona Lisa> <was created by> <Leonardo da Vinci>
    <the video 'La Joconde à Washington'> <is about> <the Mona Lisa>

The same item can be referenced in multiple triples. In this example, Bob is the subject of four triples, and the Mona Lisa is the subject of one triple and the object of two. This ability to have the same item be the subject of one triple and the object of another makes it possible to effect connections among triples, and connected triples form graphs.

Figure 2:
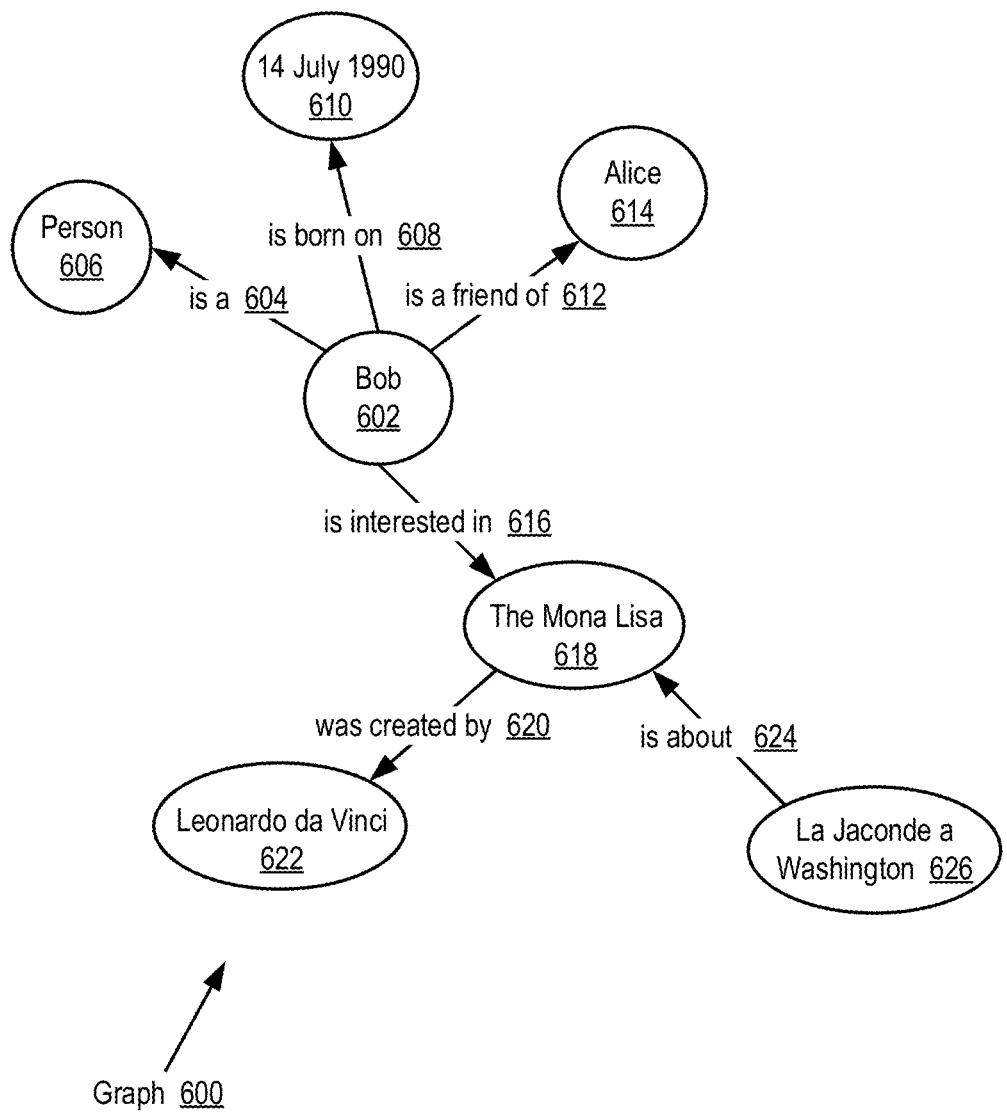
FIG. 2 sets forth a line drawing of an example graph of semantic triples.

For further explanation of relations among triples and graphs, FIG. 2 sets forth a line drawing of a graph (600). The example graph of FIG. 2 implements in graph form the example triples set forth above regarding Bob and the Mona Lisa. In the example of FIG. 2, the graph edges (604, 608, 612, 616, 620, 624) represent respectively relations among the nodes, that is, represent the predicates <is a>, <is a friend of>, <is born on>, <is interested in>, <was created by>, and <is about>. The nodes themselves represent the subjects (602, 618, 626) and objects (606, 610, 614, 618, 622) of the triples, <Bob>, <person>, <Alice>, <the $4^{th}$ of July 1990>, <the Mona Lisa>, <Leonardo da Vinci>, and <the video 'La Joconde a Washington'>. The node (618) representing the Mona Lisa is both a subject and an object. The node (618) representing the Mona Lisa is an object of the triple (602, 616, 618) that describes Bob's interest. The node (618) representing the Mona Lisa is a subject of the triple (618, 620, 622) that describes the Mona Lisa's creation by Leonardo.

In systems of knowledge representation, knowledge represented in graphs of triples, including, for example, knowledge representations implemented in Gremlin, in Cypher, in Prolog databases, in Lisp data structures, or in RDF-oriented ontologies in RDFS, OWL, and other ontology languages. Search and inference are effected against such graphs by search engines configured to execute semantic queries in, for example, Gremlin, Cypher, Prolog, Lisp, or SPARQL.

Gremlin is a query language provided through the TinkerPop graph computing framework from the Apache Foundation. Cypher is an AI program that generates SPARQL queries from natural language input, allowing users to speak plain language to update and query databases; Cypher brings its own grammar and lexicon to natural language processing. SPARQL is a recursive acronym for "SPARQL Protocol and RDF Query Language." Lisp is a reliable, flexible programming language that is widely used in artificial intelligence, knowledge representation, and semantic applications. Prolog is a general-purpose logic programming language. Prolog supports queries against connected triples expressed as statements and rules in a Prolog database. SPARQL supports queries against ontologies expressed in RDFS, OWL, or other RDF-oriented ontologies. Regarding Prolog, SPARQL, Cypher, Gremlin, Lisp, and so on, these are examples of technologies explanatory of example embodiments of the present invention. Thus, such are not limitations of the present invention. Knowledge representations useful according to embodiments can take many forms in the art, now or in the future, and all such are now and will continue to be well within the scope of the present invention.

A description logic is a member of a family of formal knowledge representation languages. Some description logics are more expressive than propositional logic but less expressive than first-order logic. In contrast to first-order logics, reasoning problems for description logics are usually decidable. Efficient decision procedures therefore can be implemented for problem of search and inference in description logics. There are general, spatial, temporal, spatiotemporal, and fuzzy descriptions logics, and each description logic features a different balance between expressivity and reasoning complexity by supporting different sets of mathematical constructors.

Search queries are disposed along a scale of semantics. A traditional web search, for example, is disposed upon a zero point of that scale, no semantics, no structure. A traditional web search against the keyword "derivative" returns thousands of HTML documents discussing the literary concept of derivative works as well as calculus procedures. A traditional web search against the keyword "differential" returns many web pages describing automobile parts and many web pages discussing calculus functions.

Other queries are disposed along mid-points of the scale, some semantics, some structure, not entirely complete. This is actually a current trend in web search. Such systems may be termed executable rather than decidable. From some points of view, decidability is not a primary concern. In many Web applications, for example, data sets are huge, and they simply do not require a 100 percent correct model to analyze data that may have been spidered, scraped, and converted into structure by some heuristic program that itself is imperfect. People use Google because it can find good answers a lot of the time, even if it cannot find perfect answers all the time. In such rough-and-tumble search environments, provable correctness is not a key goal.

Other classes of queries are disposed where correctness of results is important, and decidability enters. A user who is a tele-agent in a data center speaking by phone with an automotive customer discussing a front differential is concerned not to be required to sort through calculus results to find correct terminology. Such a user needs correct definitions of automotive terms, and the user needs query results in conversational real time, that is, for example, within seconds.

In formal logic, a system is decidable if there exists a method such that, for every assertion that can be expressed in terms of the system, the method is capable of deciding whether or not the assertion is valid within the system. In practical terms, a query against a decidable description logic will not loop indefinitely, crash, fail to return an answer, or return a wrong answer. A decidable description logic supports data models or ontologies that are clear, unambiguous, and machine-processable. Undecidable systems do not. A decidable description logic supports algorithms by which a computer system can determine equivalence of classes defined in the logic. Undecidable systems do not. Decidable description logics can be implemented in C, C++, SQL, Lisp, RDF/RDFS/OWL, and so on. In the RDF space, subdivisions of OWL vary in decidability. Full OWL does not support decidability. OWL DL does.

Figure 3:
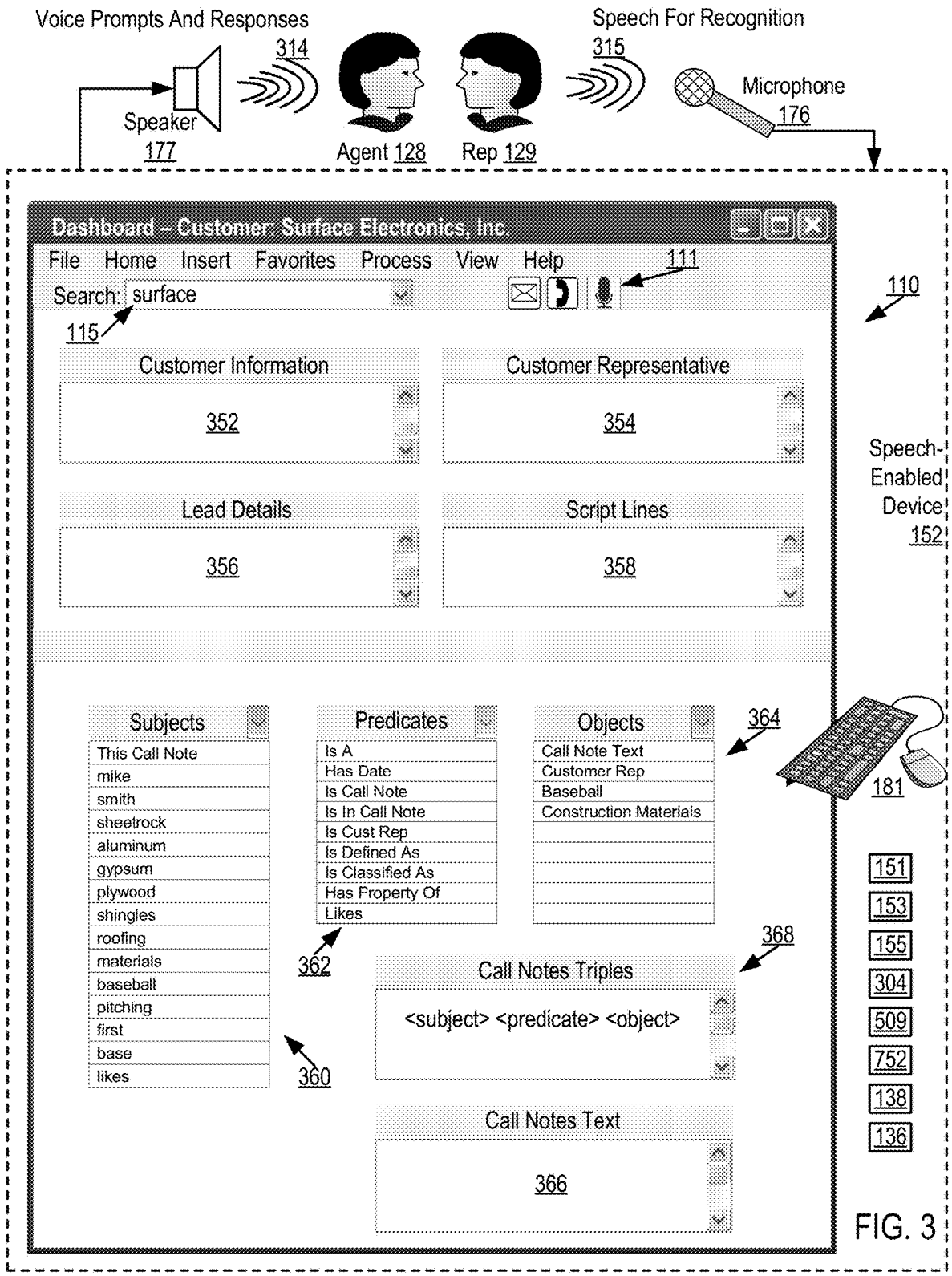
FIG. 3 sets forth a line drawing of an example dashboard that implements CRM according to embodiments of the present invention.

For further explanation, FIG. 3 sets forth a line drawing of an example dashboard (110) that implements CRM according to embodiments of the present invention. The dashboard is implemented in a graphical user interface ('GUI') of a speech-enabled device (152). The dashboard itself is a speech-enabled application that provides to a tele-agent a front-end, an interface, for all pertinent functionality of a call center, leads, scripts, enterprise knowledge base, triple servers with semantic CRM stores and call notes stores, voice services, and so on, and so on. The dashboard implements digital controls called widgets. A widget is a GUI element of interaction, such as a button or a scroll bar. Widgets are automated elements a computer user interacts with through direct manipulation to read or edit information or administer control. Each widget appears as a digital part of a GUI and facilitates a specific type of user-computer interaction. Some widgets support interaction with the user, for example, labels, buttons, and check boxes. Others act as containers that group widgets added to them, for example, windows, panels, and tabs. Examples of widgets optionally useful in CRM controls according to embodiment include buttons, radio buttons, check boxes, sliders, list boxes, spinners, drop-down lists, menus, menu bars, scroll bars, text boxes, dialog boxes, and so on.

In the example of FIG. 3, by use of a search widget (115), the dashboard has been navigated to point to customer information for a customer named Surface Electronics, Inc. The Customer Information scroll box widget (352) will display customer information (not shown) such as address, web page link, email, telephones, and so on. Similarly, the Customer Representative scroll box widget (354) will display (not shown) identities, contact information, and other information for each customer representative of Surface Electronics, Inc., with whom any tele-agent has spoken.

The dashboard implements CRM according to embodiments by parsing (304) a word (509), from call notes of a conversation between a tele-agent and a customer representative, into a parsed triple (752) of a description logic—and recording at least some parsed triples as call notes (138) in a semantic CRM triple store (136). Here are described three alternative ways that the dashboard functions to acquire words for parsing into semantic triples.

In a first alternative way of providing a digitized word (509) to the parsing process (304), the dashboard through a speech engine (153) recognizes words into digitized speech from a conversation (313) between a tele-agent (128) and a customer representative (129). In this example method, recognizing speech from such a conversation is carried out as follows. Words of speech from the conversation (313) travel through a microphone (176) and amplifier on the speech-enabled device (152) and, in a thin-client architecture, through a VOW connection to a voice server (151) where a speech recognition engine recognizes the words into a stream of digitized speech which is handed off to a natural language processing engine which processes the digitized speech into sentences and parts of speech and passes the words so processed (509) to the parsing process (304) where they are parsed into triples (752). This is a first alternative way in which the dashboard provides a digitized word (509) to the parsing process (304).

In a second alternative way of providing a digitized word to the parsing process, the dashboard receives into a natural language processing engine (155) a word of call notes from a text box widget (366). The tele-agent, rather than speaking call notes, types call notes into a text box widget (366), and all the text so typed is provided by the dashboard as digitized words directly to a natural language processing engine (155). The natural language processing engine sees no difference between typed words from the text box (366) and the words in a stream of digitized speech from a spoken conversation. Thus, this second alternative is similar to the first alternative with the exception that there is no need for speech recognition, because when a stream of digitized text arrives in the speech engine (153), the words in the stream are already digitized by typing in through the text box (366).

The natural language processing engine (155) works the same way as in the first alternative, processing the digitized text from the text box (366) into sentences and parts of speech and passing the words so processed (509) to the parsing process (304) where they are parsed into triples (752). This is a second alternative way in which the dashboard provides a digitized word (509) to the parsing process (304).

In a third alternative way of providing a digitized word to the parsing process, the dashboard passes to the parsing process (304) a word (509) designated as an element of a parsed triple through widgets (360, 362, 364) of the dashboard. The widgets are pull-down menu listings of Subjects for triples (360), Predicates for triples (362), and Objects for triples (364). The Predicates (362) and Objects (364) are triple elements already defined in an ontology supportive of a semantic CRM triple store (136) and a call notes triple store (138). The Subjects (360) are a stream of word candidates for inclusion in triples. Words in the Subjects pull-down menu (360) are provided by the speech engine (153) from call notes text (366) or from words recognized from the conversation (313). The tele-agent (128) passes a word (509) to the parsing process (304) by selecting a word from the Subjects pull-down menu (360), for example, selecting by keyboard or mouse (181). The tele-agent can select a word from the pull-down (360) by double-click or by drag-and-drop onto an assembly box (368) for triples. The Call Notes Triples widget (368) functions both as an assembly area for tele-agent selections of elements of triples and also as a display area for triples output from the parser. The tele-agent can optionally also select a Predicate (362) or an Object (364) for inclusion in the same triple with the selected Subject, also by double-click or drag-and-drop. The tele-agent's selections of predicates and objects in some embodiments can be binding upon the parser (304). In other embodiments, the tele-agent's selections are treated by the parser merely as recommendations. The parsing process (304) optionally accepts the tele-agent's selections of predicates and objects, or the parsing process makes its own selections of predicates and triples for inclusion with the word (509) in at least one parsed triple (752). This is a third alternative way in which the dashboard provides a digitized word (509) to the parsing process (304).

Figure 4:
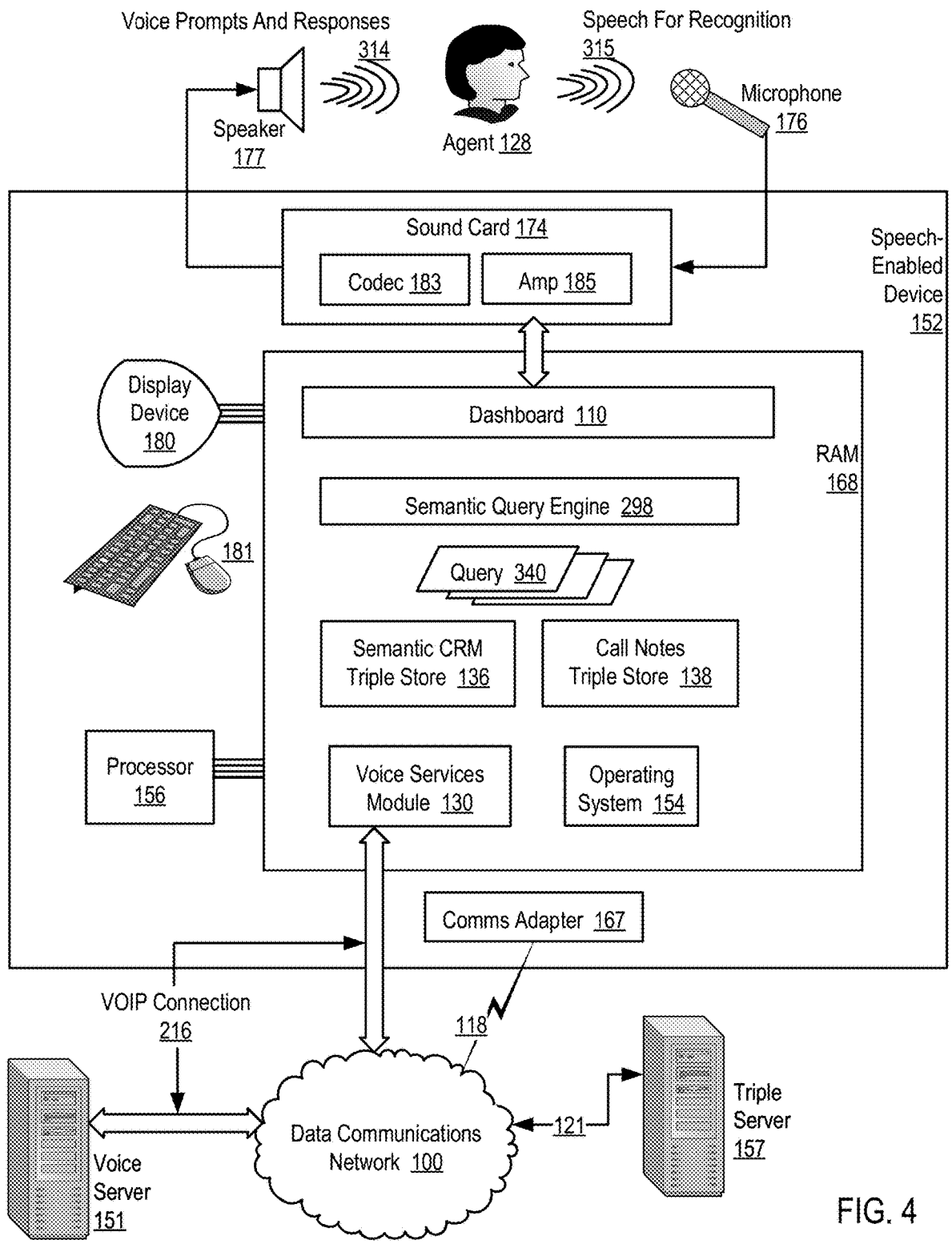
FIG. 4 sets forth a functional block diagram of example apparatus for CRM in a thin-client architecture according to embodiments of the present invention.

For further explanation, FIG. 4 sets forth a functional block diagram of example apparatus for CRM in a thin-client architecture according to embodiments of the present invention. A thin-client architecture is a client-server architecture in which at least some of, perhaps most of, perhaps all of, speech processing and triple processing is off-loaded from the client to servers. Thinness of a thin-client varies. The speech-enabled device in the example of FIG. 4 is a thin client in which most speech processing is off-loaded to a voice server (151). The speech-enabled device (152) accepts voice input (315, 174), but then transfers the voice input through a VOIP connection (216) to the voice server (151) where all speech processing is performed. The speech-enabled device in this example does implement some capacity for triple processing (323, 325) and query execution (298), but none of that would be absolutely necessary in a thin client. Devices with reduced storage capacity, a smartwatch or a mobile phone for example, can be implemented with no semantic query engine (298) and no triple store (323, 325), merely passing queries through to a triple server (157) that itself carries out all triple storage and all query processing.

In the particular example of FIG. 4, the speech-enabled device occupies the middle ground of thin-client architecture. It supports little speech processing, but it does support some triple processing. The speech-enabled device in this example performs triple processing and query execution only against triple stores (136, 138) in RAM (168), leaving large-scale storage to the triple server (157). The semantic query engine (298) loads the triple stores as needed to respond to queries. Thus, there are query misses. When the semantic query engine cannot satisfy a query with the triple stores in RAM, it does not conclude failure. Instead it passes the query (340) to the triple server (157), and, if the triple server can satisfy the query by use of triples on the server, it passes back to the speech-enabled device both the query results and the triples that satisfied the query, which triples are then stored in RAM on the speech-enabled device for use against similar queries in the future. Over time, such an architecture builds on the speech-enabled device query stores containing frequently useful triples and reduces the need for costly query trips across the network to the triple server—while at the same time functioning with a relatively thin layer of computing resources on the client side. This is a compromise between an extremely thin client with no triple storage at all and the thick client described below with regard to FIG. 8.

The example apparatus of FIG. 4 includes a speech-enabled device (152) and a voice server (151) connected for data communication by a VOIP connection (216) through a data communications network (100). A dashboard (110) runs on the speech-enabled device (152), and in this example, the dashboard (110) is a speech-enabled application that operates user I/O by voice (315), by GUI on a display (180), by keyboard and mouse (181), and so on. The dashboard (110) may be implemented as a set or sequence of X+V or SALT documents that execute on a speech-enabled browser, a Java Voice application that executes on a Java Virtual Machine, or a speech-enabled application implemented in other technologies as may occur to those of skill in the art. The example speech-enabled device of FIG. 4 also includes a sound card (174), which is an example of an I/O adapter specially designed for accepting analog audio signals from a microphone (176) and converting the audio analog signals to digital form for further processing by a codec (183).

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols may be used to effect VOIP, including, for example, types of VOIP effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The dashboard (110) in this example is a user-level, speech-enabled, client-side computer program that presents a voice interface to user (128), provides audio prompts and responses (314) and accepts input speech for recognition (315). The dashboard (110) provides a speech interface through which a user may provide oral speech for recognition through microphone (176) and have the speech digitized through an audio amplifier (185) and a coder/decoder ('codec') (183) of a sound card (174) and provide the digitized speech for recognition to a voice server (151). Speech-enabled application (195) packages digitized speech in recognition request messages according to a VOIP protocol, and transmits the speech to voice server (151) through the VOW connection (216) on the network (100).

The voice server (151) provides voice recognition services for speech-enabled devices by accepting dialog instructions, VoiceXML segments, or the like, and returning speech recognition results, including text representing recognized speech, text for use as variable values in dialogs, and output from execution of semantic interpretation scripts as well as voice prompts. Voice server (151) includes computer programs that provide text-to-speech ('TTS') conversion for voice prompts and voice responses to user input in speech-enabled applications such as, for example, X+V applications, SALT applications, or Java Speech applications.

The speech-enabled device (152) in the example of FIG. 4 includes a semantic query engine (298), a module of automated computing machinery that accepts from the dashboard (110) and executes against triple stores (323, 325) semantic queries (340). The dashboard (110) formulates semantic queries with user input from speech (315), GUI, keyboard, mouse (180, 181), or the like. A semantic query is a query designed and implemented against structured data. Semantic queries utilize logical operators, namespaces, pattern matching, subclassing, transitive relations, semantic rules and contextual full text search. Semantic queries work on named graphs, linked-data, or triples. In embodiments of the present invention, triples typically are linked so as to form graphs. This enables a semantic query to process actual relationships between items of information and infer answers from the network of data. Semantic queries contrast with semantic search, which attempts with various levels of success to use semantics in unstructured text to improve meaning of search results.

Example formulations of semantic queries are had in C, C++, Java, Prolog, Lisp, and so on. The semantic web technology stack of the W3C, for example, offers SPARQL to formulate semantic queries in a syntax similar to SQL. Semantic queries are used against data structured in triple stores, graph databases, semantic wikis, natural language, and artificial intelligence systems. As mentioned, semantic queries work on structured data, and in the particular examples of the present case, the structured data is words described and defined in semantic triples connected in ways that conform to a description logic. In many embodiments of the present invention, semantic queries are asserted against data structured according to a description logic that implements decidability.

In the example apparatus of FIG. 4, the speech-enabled device is coupled for data communication through a communications adapter (167), wireless connection (118), data communications network (100), and wireline connection (121) to a triple server (157). The triple server (157) provides large volume backup for triple stores (323, 325). The triple server is a configuration of automated computing machinery that serializes triples and stores serialized triples in relational databases, tables, files, or the like. The triple server retrieves as needed from non-volatile storage such serialized triples, parses the serialized triples into triple stores, and provides such triple stores upon request to speech-enabled devices for use in systems that utilize the triples in CRM according to embodiments of the present invention.

Effecting CRM with triples of description logic according to embodiments of the present invention, particularly in a thin-client architecture, may be implemented with one or more voice servers. A voice server is a computer, that is, automated computing machinery, that provides speech recognition and speech synthesis. For further explanation, FIG. 5 sets forth a block diagram of automated computing machinery comprising an example of a computer useful as a voice server (151) supportive of CRM with a speech-enabled device according to embodiments of the present invention. The voice server (151) of FIG. 2 includes at least one computer processor (156) or 'CPU' as well as random access memory (168) ('RAM') which is connected through a high-speed memory bus (166) and bus adapter (158) to processor (156) and to other components of the voice server.

Stored in RAM (168) is a voice server application (188), a module of computer program instructions capable of operating a voice server in a system that is configured for use in CRM according to embodiments of the present invention. Voice server application (188) provides voice recognition services for speech-enabled devices by accepting requests for speech recognition and returning speech recognition results, including text representing recognized speech, text for use as variable values in dialogs, and text as string representations of scripts for semantic interpretation.

Voice server application (188) also includes computer program instructions that provide text-to-speech ('TTS') conversion for voice prompts and voice responses to user input in speech-enabled applications such as, for example, speech-enabled browsers, X+V applications, SALT applications, or Java Speech applications, and so on.

Voice server application (188) may be implemented as a web server, implemented in Java, C++, Python, Perl, or any language that supports X+V, SALT, VoiceXML, or other speech-enabled languages, by providing responses to HTTP requests from X+V clients, SALT clients, Java Speech clients, or other speech-enabled client devices. Voice server application (188) may, for a further example, be implemented as a Java server that runs on a Java Virtual Machine (102) and supports a Java voice framework by providing responses to HTTP requests from Java client applications running on speech-enabled devices. And voice server applications that support embodiments of the present invention may be implemented in other ways as may occur to those of skill in the art, and all such ways are well within the scope of the present invention.

The voice server (151) in this example includes a natural language processing speech recognition ("NLP-SR") engine (153). An NLP-SR engine is sometimes referred to in this paper simply as a 'speech engine.' A speech engine is a functional module, typically a software module, although it may include specialized hardware also, that does the work of recognizing and generating human speech. In this example, the speech engine (153) is a natural language processing speech engine that includes a natural language processing ("NLP") engine (155). The NLP engine accepts recognized speech from an automated speech recognition ('ASR') engine, processes the recognized speech into parts of speech, subject, predicates, object, and so on, and then converts the recognized, processed parts of speech into semantic triples for inclusion in triple stores.

The speech engine (153) includes an automated speech recognition ('ASR') engine for speech recognition and a text-to-speech ('TTS') engine for generating speech.

The speech engine also includes a grammar (104), a lexicon (106), and a language-specific acoustic model (108). The language-specific acoustic model (108) is a data structure, a table or database, for example, that associates speech feature vectors ('SFVs') with phonemes representing pronunciations of words in a human language. The lexicon (106) is an association of words in text form with phonemes representing pronunciations of each word; the lexicon effectively identifies words that are capable of recognition by an ASR engine. Also stored in RAM (168) is a Text-To-Speech ('TTS') Engine (194), a module of computer program instructions that accepts text as input and returns the same text in the form of digitally encoded speech, for use in providing speech as prompts for and responses to users of speech-enabled systems.

The grammar (104) communicates to the ASR engine (150) the words and sequences of words that currently may be recognized. For further explanation, distinguish the purpose of the grammar and the purpose of the lexicon. The lexicon associates with phonemes all the words that the ASR engine can recognize. The grammar communicates the words currently eligible for recognition. The two sets at any particular time may not be the same.

Grammars may be expressed in a number of formats supported by ASR engines, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V <form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
  #JSGF V1.0;
  grammar command;
  <command> = [remind me to] call | phone | telephone <name>
<when>;
  <name> = bob | martha | joe | pete | chris | john | artoush;
  <when> = today | this afternoon | tomorrow | next week;
  ]]>
</grammar>
```

In this example, the elements named <command>, <name>, and <when> are rules of the grammar. Rules are a combination of a rulename and an expansion of a rule that advises an ASR engine or a voice interpreter which words presently can be recognized. In this example, expansion includes conjunction and disjunction, and the vertical bars '|' mean 'or.' An ASR engine or a voice interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush', and the <when>rule accepts 'today' or 'this afternoon' or 'tomorrow' or 'next week.' The command grammar as a whole matches utterances like these:

"phone bob next week," "telephone martha this afternoon," "remind me to call chris tomorrow," and "remind me to phone pete today."

The voice server application (188) in this example is configured to receive, from a speech-enabled client device located remotely across a network from the voice server, digitized speech for recognition from a user and pass the speech along to the ASR engine (150) for recognition. ASR engine (150) is a module of computer program instructions, also stored in RAM in this example. In carrying out automated speech recognition, the ASR engine receives speech for recognition in the form of at least one digitized word and uses frequency components of the digitized word to derive a speech feature vector or SFV. An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

Also stored in RAM is a VoiceXML interpreter (192), a module of computer program instructions that processes VoiceXML grammars. VoiceXML input to VoiceXML interpreter (192) may originate, for example, from VoiceXML clients running remotely on speech-enabled devices, from X+V clients running remotely on speech-enabled devices, from SALT clients running on speech-enabled devices, from Java client applications running remotely on multimedia devices, and so on. In this example, VoiceXML interpreter (192) interprets and executes VoiceXML segments representing voice dialog instructions received from remote speech-enabled devices and provided to VoiceXML interpreter (192) through voice server application (188).

A speech-enabled application like a dashboard (110 on FIG. 4) in a thin-client architecture may provide voice dialog instructions, VoiceXML segments, VoiceXML <form> elements, and the like, to VoiceXML interpreter (149) through data communications across a network with such a speech-enabled application. The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA') (193). The VoiceXML interpreter interprets VoiceXML dialogs provided to the VoiceXML interpreter by a speech-enabled application.

As mentioned above, a Form Interpretation Algorithm ('FIA') drives the interaction between the user and a speech-enabled application. The FIA is generally responsible for selecting and playing one or more speech prompts, collecting a user input, either a response that fills in one or more input items, or a throwing of some event, and interpreting actions that pertained to the newly filled-in input items. The FIA also handles speech-enabled application initialization, grammar activation and deactivation, entering and leaving forms with matching utterances and many other tasks. The FIA also maintains an internal prompt counter that is increased with each attempt to provoke a response from a user. That is, with each failed attempt to prompt a matching speech response from a user an internal prompt counter is incremented.

Also stored in RAM (168) is an operating system (154). Operating systems useful in voice servers according to embodiments of the present invention include UNIX™, Linuxmi, Microsoft NT™, AIX™, IBM's i5/OS™, and others as will occur to those of skill in the art. Operating system (154), voice server application (188), VoiceXML interpreter (192), ASR engine (150), JVM (102), and TTS Engine (194) in the example of FIG. 5 are shown in RAM (168), but many components of such software typically are stored in non-volatile memory also, for example, on a disk drive (170).

Figure 5:
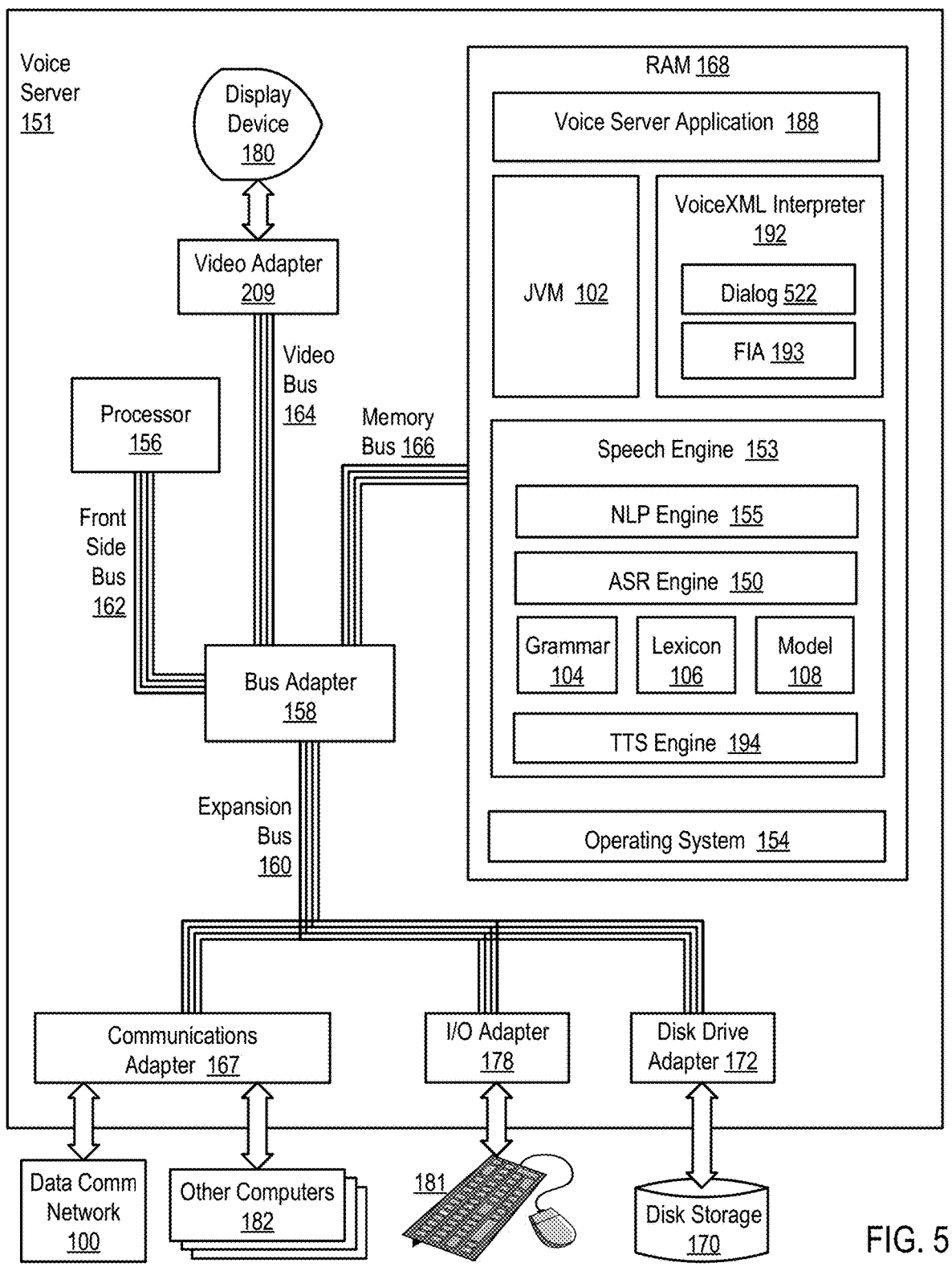
FIG. 5 sets forth a block diagram of automated computing machinery comprising an example of a computer useful as a voice server for CRM according to embodiments of the present invention.

Voice server (151) of FIG. 5 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub.

Examples of expansion buses useful in voice servers according to embodiments of the present invention include Industry Standard Architecture ('ISA') buses and Peripheral Component Interconnect ('PCI') buses.

Voice server (151) of FIG. 5 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 5 includes one or more input/output (I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 5 includes a video adapter (209), which is an example of an I/O adapter specially designed for graphic output to a display device (180) such as a display screen or computer monitor. Video adapter (209) is connected to processor (156) through a high-speed video bus (164), bus adapter (158), and the front side bus (162), which is also a high-speed bus.

The example voice server (151) of FIG. 5 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for embodiments of the present invention include modems for wired dial-up communications, Ethernet (IEEE 802.3) adapters for wired data communications network communications, and 802.11 adapters for wireless data communications network communications.

Figure 6:
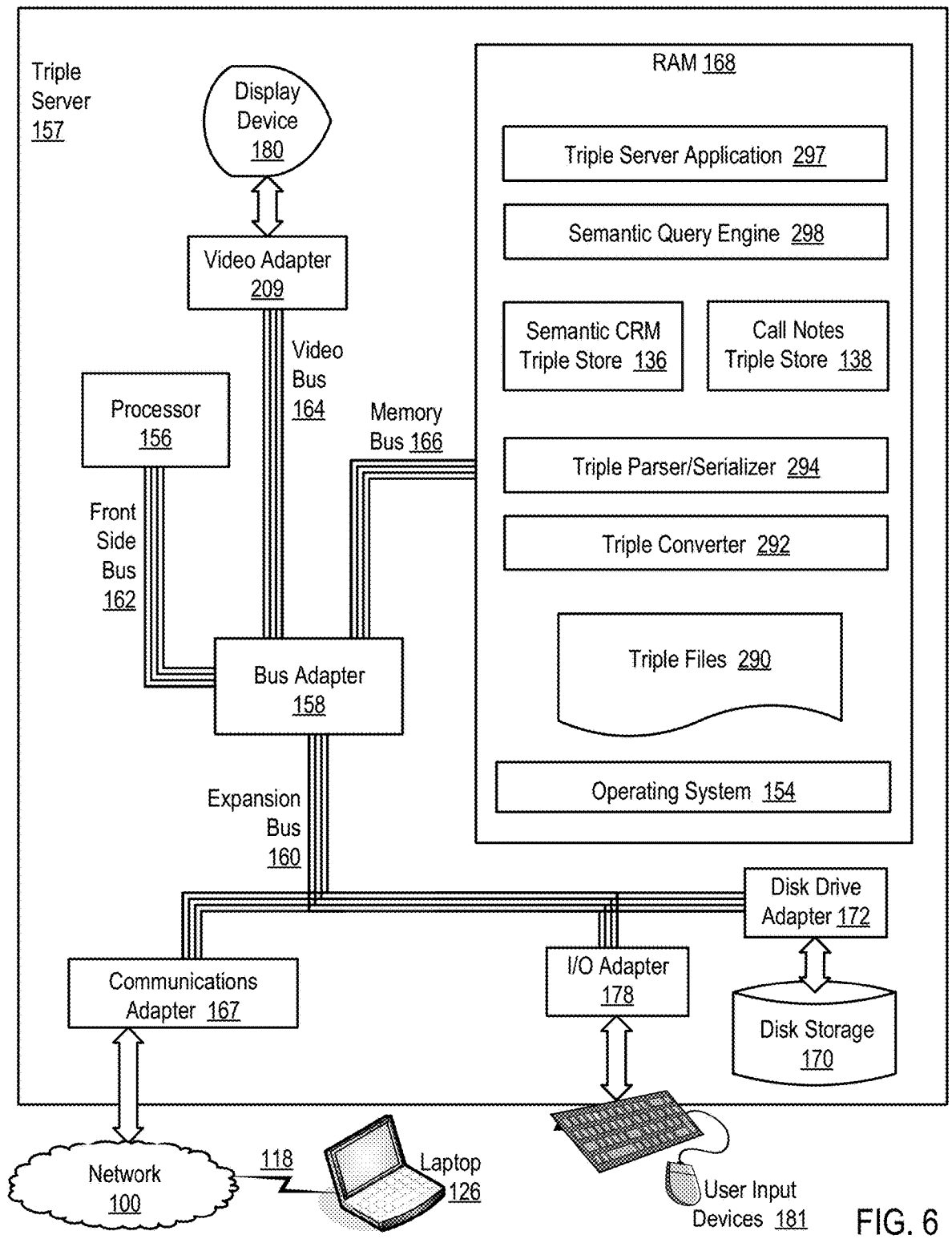
FIG. 6 sets forth a block diagram of automated computing machinery comprising an example of a computer useful as a triple server for CRM according to embodiments of the present invention.

For further explanation, FIG. 6 sets forth a block diagram of automated computing machinery comprising an example of a computer useful as a triple server (157) for CRM according to embodiments of the present invention. The triple server (157) of FIG. 6 includes at least one computer processor (156) or 'CPU' as well as random access memory (168) ('RAM') which is connected through a high-speed memory bus (166) and bus adapter (158) to processor (156) and to other components of the triple server. The processor is connected through a video bus (164) to a video adapter (209) and a computer display (180). The processor is connected through an expansion bus (160) to a communications adapter (167), an I/O adapter (178), and a disk drive adapter (172). The processor is connected to a speech-enabled laptop (126) through data communications network (100) and wireless connection (118). Disposed in RAM is an operating system (154).

Also disposed in RAM are a triple server application program (297), a semantic query engine (298), a semantic CRM triple store (136), a call notes triple store (138), a triple parser/serializer (294), a triple converter (292), and one or more triple files (290). The triple server application program (297) accepts, through network (100) from speech-enabled devices such as laptop (126), semantic queries that it passes to the semantic query engine (298) for execution against the triple stores (136, 138).

The triple parser/serializer (294) administers the transfer of triples between triple stores and various forms of disk storage or other non-volatile storage. The triple parser/serializer (294) accepts as inputs the contents of triple stores and serializes them for output as triple files (290), tables, relational database records, spreadsheets, text documents, or the like, for long-term storage in non-volatile memory, such as, for example, a hard disk (170). The triple parser/serializer (294) accepts triple files (290) as inputs and outputs parsed triples into triple stores. In many embodiments, when the triple parser/serializer (294) accepts triple files (290) as inputs and outputs parsed triples into triple stores, the triple parser/serializer stores the output triple stores into contiguous segments of memory. Contiguous storage can be effected in the C programming language by a call to the malloc( )function. Contiguous storage can be effected by the Python buffer protocol. Contiguous storage can be effected in other ways as will occur to those of skill in the art, and all such ways are within the scope of the present invention. In many embodiments, both triple stores (136, 138) would be stored in segments of contiguous memory.

Figure 7:
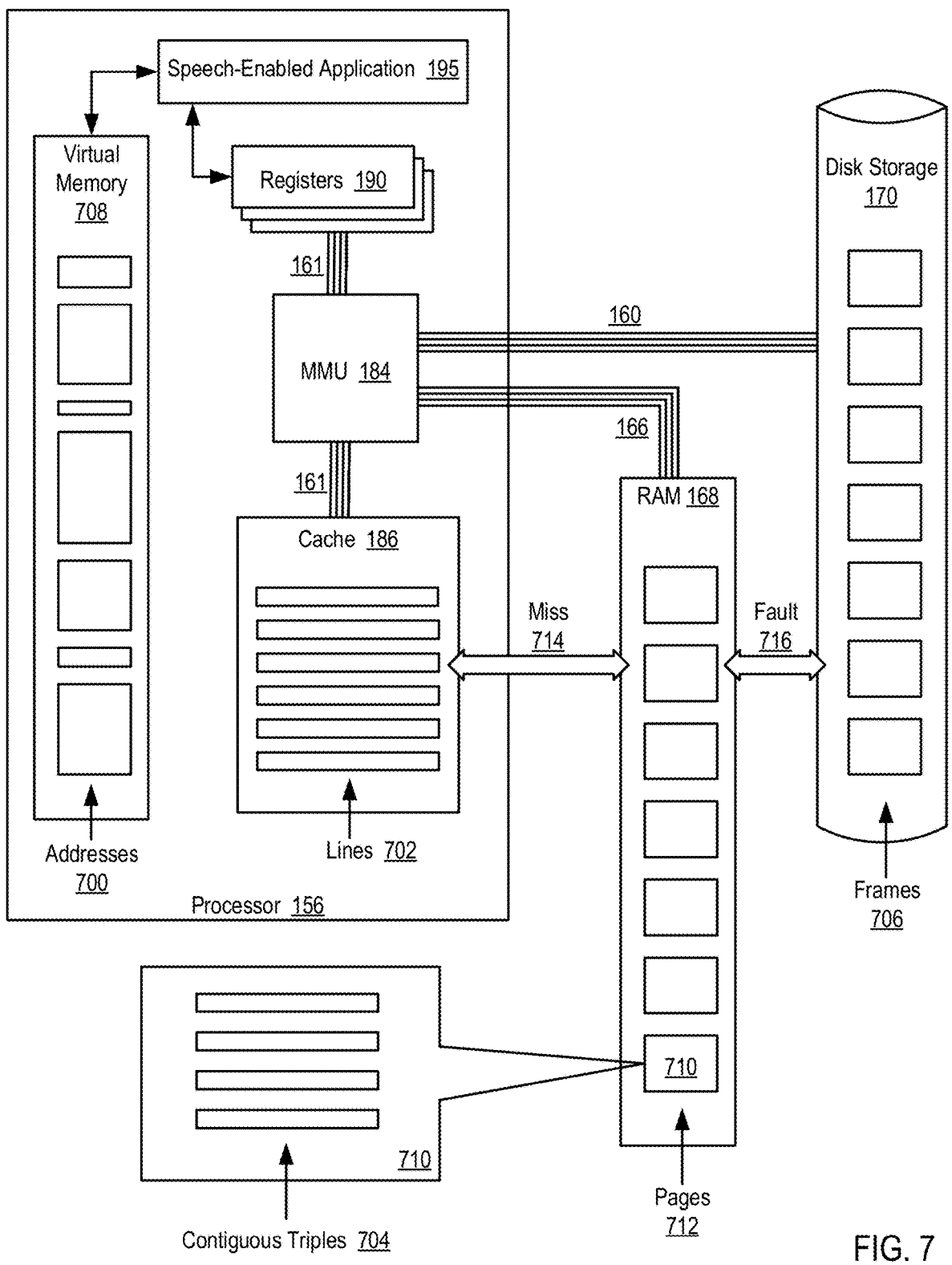
FIG. 7 sets forth a block diagram of an example computer memory system useful for CRM according to embodiments of the present invention.

Contiguous memory is explained in more detail with reference to FIG. 7. FIG. 7 sets forth a block diagram of a computer memory system, configured supportive of CRM according to embodiments, that includes a computer processor (156) composed of various registers (190) executing a speech-enabled application program, that is, a dashboard (110). The dashboard application and the registers of the processor operate with memory addresses (700) disposed in virtual memory (708). The contents of virtual memory are backed up with physical storage in an on-processor cache (186), RAM (168), and disk (170). The contents of the cache are organized in cache lines (702). Memory in RAM is organized in pages (712). Memory on disk is organized in frames (706). A memory management unit ("MMU") (184) translates virtual memory addresses into physical memory locations and moves contents of memory from physical storage to and from processor registers. In accessing physical memory, the MMU always looks first in the cache. A failure to find content in the cache is termed a "cache miss" (714). Upon a cache miss, the MMU seeks memory content in RAM (168) and moves it into the cache. Failing to find sought content in RAM, a failure termed a "page fault" (716), the MMU looks all the way out to the page frames (706) on disk, moves content into RAM (168) and then into cache (186).

Here is the challenge addressed by the use of contiguous memory. Cache access takes 10 nanoseconds. RAM access takes 100 nanoseconds. Disk access takes 10,000,000 nanoseconds. Those numbers are not intuitive. People don't experience time in nanoseconds. Look at it in more familiar terms. If cache access is viewed as taking one minute, then RAM access takes 10 minutes, and disk access for the same data takes two years. Triples scattered across virtual memory addresses risk being stored in multiple page frames. Triples stored near one another in a contiguous memory segment are much more likely to be stored in a small number of page frames.

Suppose a set of call notes is composed of 500-word families each of which includes three words so that the entire set is expressed in 1500 words each of which on average is composed of 10 bytes of storage for a total for the notes of 15 kilobytes of storage. Some computer systems today support memory page sizes of a megabyte or more.

Such a note set can be stored in a single memory page, and, once that page is in RAM, operation of the note set for CRM can proceed with no risk of page faults at all. Even if contiguous storage for such a note set fell across a page boundary, the entire note set can still be loaded with only two page faults, and, after it is loaded into RAM, it can be operated with zero page faults going forward. Cache misses would still be required to load the contents into cache, but, except for the first one or two misses, none of the others would risk a page fault. The inventors estimate that after a short period of operation, the cache miss rate would be less than one percent for operation of such a set of call notes triples in the context of CRM. That is, when a set of call notes is disposed in contiguous memory in support of CRM according to embodiments of the present invention, memory access times generally will approximate cache access times, just a few nanoseconds, for more than 99% of memory access.

Figure 8:
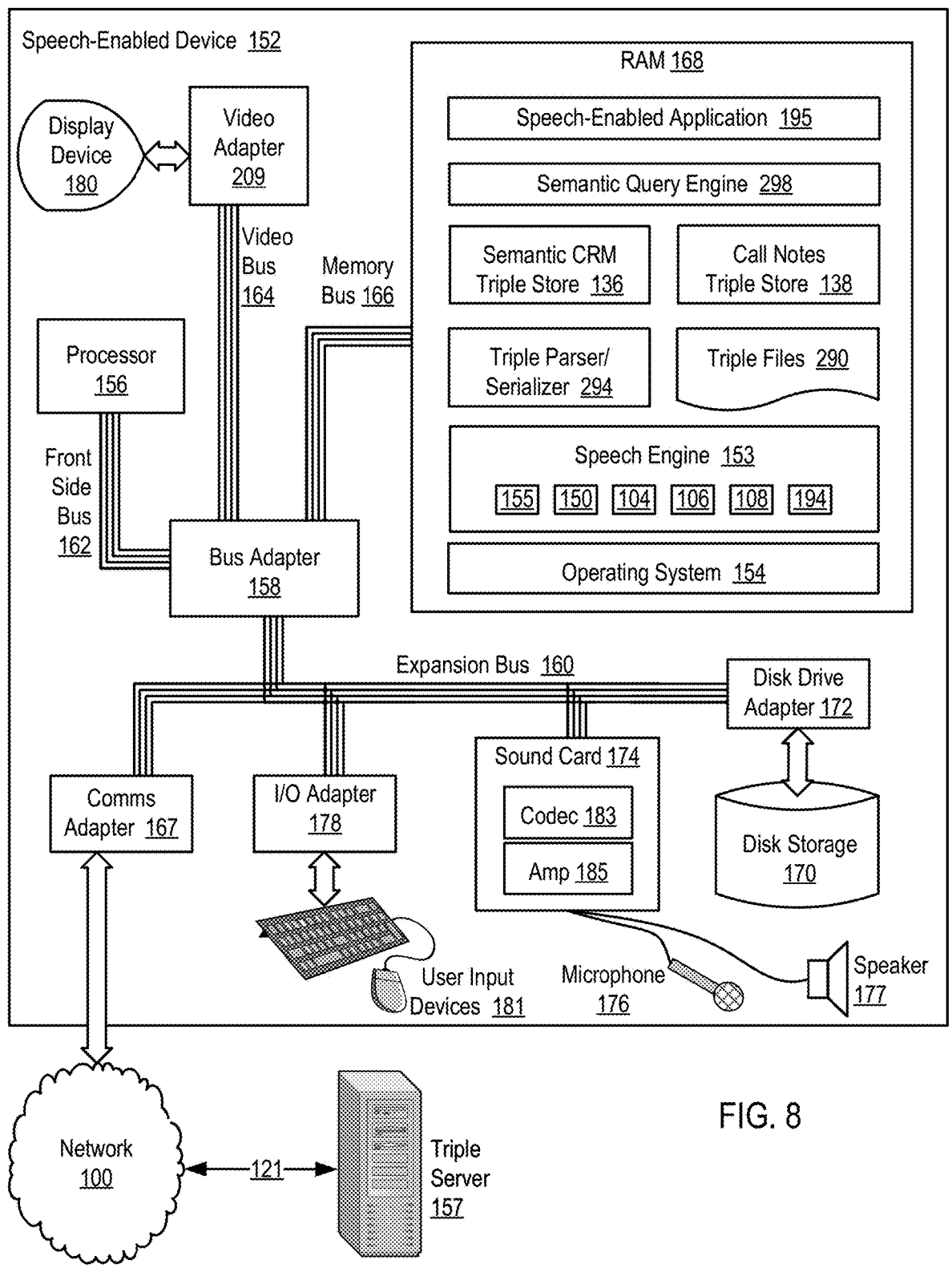
FIG. 8 sets forth a functional block diagram of example apparatus for CRM in a thick-client architecture according to embodiments of the present invention.

For further explanation, FIG. 8 sets forth a functional block diagram of example apparatus, a speech-enabled device for CRM, in a thick-client architecture according to embodiments of the present invention. A thick-client architecture is a client-server architecture in which all or most of the functionality required to administer CRM with semantic triples is supported directly on client-side speech-enabled devices rather than on servers. Servers are used for backup and synchronization rather than speech recognition or semantic queries. A thick client requires resources, processor power and storage, possibly not always available on a small device such as a smartwatch or a mobile phone. In a thick client with sufficient data processing resources, however, all pertinent functionality, queries, triples, speech, are typically immediately and fully useful, regardless of network availability.

The thick-client speech-enabled device (152) in the example of FIG. 8 is automated computer machinery that includes a processor (156), RAM (168), data buses (162, 164, 166, 160), video (180, 209), data communications (167), I/O (178), and disk storage (170). Disposed in RAM are a speech-enabled application program (195), a semantic query engine (298), a semantic CRM triple store (136), a call notes triple store (138), a triple parser/serializer (294), a triple converter (292), and one or more triple files (290). The speech-enabled application (195) in embodiments is often implemented as a dashboard (110 on FIGS. 1 and 3) that provides substantial GUI I/O capabilities for, for example, tele-agents. The speech-enabled application (195) accepts from user input semantic queries that it passes to the semantic query engine (298) for execution against the triple stores (136, 138). All pertinent triples are available in local RAM. All queries succeed or fail based on local storage alone. No queries are forwarded to the triple server (157). The triple server (157) provides long-term backup and synchronization functions when multiple client-side devices share the contents of triple stores, but, for any particular query, responsive triples (136, 138) are available directly on the client side.

The triple parser/serializer (294) administers the transfer of triples between triple stores and disk storage (170), and disk storage is available directly on the thick-client (152) rather than across a network on a server. The triple parser/serializer (294) accepts as inputs the contents of triple stores and serializes them for output as triple files (290), tables, relational database records, spreadsheets, text documents, other non-SQL items, or the like, for long-term storage in non-volatile memory, such as, for example, a hard disk (170). The triple parser/serializer (294) accepts triple files (290) as inputs and outputs parsed triples into triple stores. In at least some embodiments, when the triple parser/serializer (294) accepts triple files (290) as inputs and outputs parsed triples into triple stores, the triple parser/serializer stores the output triple stores into contiguous segments of memory.

The speech-engine (153) is a full-service NLP-SR engine that includes natural language processing (155), speech recognition (150), a grammar (104), a lexicon (106), a model (108), and text-to-speech processing (194), all as described in more detail above with regard to FIG. 4. The thick-client speech-enabled device (152) has no need to reach across a network for speech-related processing. Full speech enablement is available directly on the speech-enabled device itself.

Figure 9:
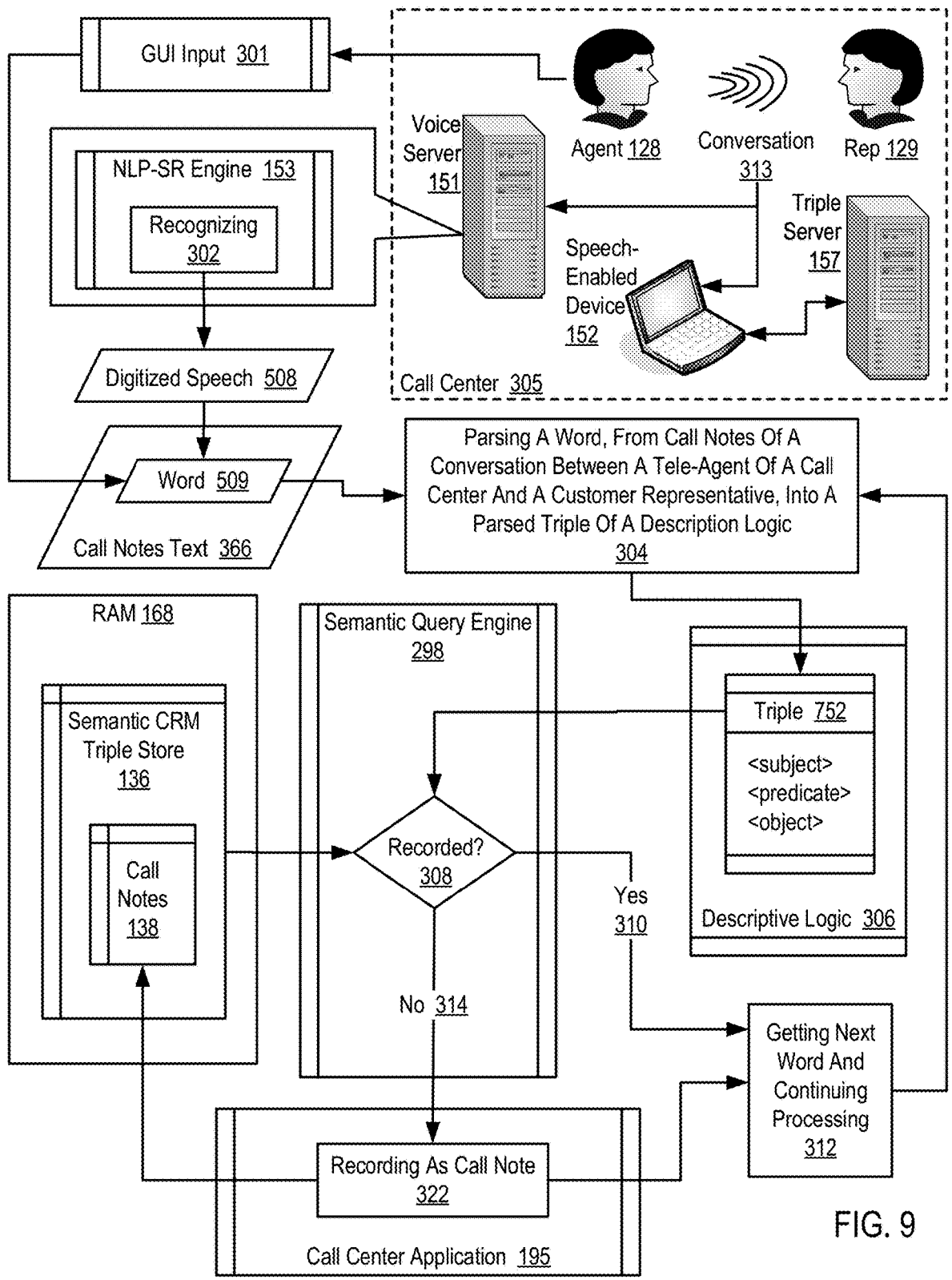
FIG. 9 sets forth a flow chart illustrating an example method of CRM according to embodiments of the present invention.

For further explanation, FIG. 9 sets forth a flow chart illustrating an example method of CRM according to embodiments of the present invention. The functions of the method of FIG. 9 are implemented with or disposed upon some combination of a speech-enabled device (152), a voice server (151), and a triple server (157). That is, for example, the NLP-SR engine (153) can be disposed upon the voice server (151) in a thin-client architecture or upon the speech-enabled device (152) in a thick-client architecture. So the question exactly where any particular function occurs depends upon the architecture, although all such elements are computers—and they are all configured together, in one architecture or another, to carry out CRM according to embodiments.

The method of FIG. 9 includes two alternative ways of acquiring a word (509) for parsing (304) into a triple (752). The word can be provided through GUI input (301), through, for example, a CRM dashboard operated by a tele-agent (128). Or the word (509) can come from digitized speech (508) recognized (302) by a speech engine (153). Either way, either by manipulation of GUI widgets or by a voice order to the speech engine, the word (509) is designated as an element of call notes (366), a prospect for inclusion in a call notes triple store (138). The raw call notes, whether entered through a GUI or entered as recognized speech, are notes of a conversation (313) between a tele-agent (128) of a call center (305) and a customer representative (129).

The method of FIG. 9 includes parsing (304) the word (509) into a parsed triple (752) of a description logic (306). The parsing process (304) can take the word from a GUI text box or a stream of digitized speech from a speech engine. The parsing process can accept a designation through a GUI of a triple element for the word, subject, predicate, or object. The parsing process can accept a designation from the speech engine of a part of speech for the word and use that to determine elements of a triple for the word, subject, predicate, object. The parsing process can function in various ways so long as the result is a fitting of the word into a semantic triple (752) with a subject, a predicate, and an object. The description logic (306) is a member of a family of formal knowledge representation languages, typically more expressive than propositional logic but less expressive than first-order logic or predicate logic generally, and, in contrast to first-order logics or predicate logics, usually supporting decidability.

In embodiments with call notes (366) recognized from speech, both recognizing (302) speech and parsing (304) words into triples are carried out by an NLP-SR engine (153). The NLP-SR engine inputs, optionally at least, a portion of the conversation (313) designated as call notes and presents to the parsing function (304) a stream of digitized speech (508) as prospective call notes. The parsing function processes a word (509), hands a triple off to a query engine (298) for further processing, and then loops (312) back to parse the next word in the stream of digitized speech designated as call notes (366).

The parsing function (304) hands off a parsed triple (752) to a semantic query engine (298). The semantic query engine determines whether the parsed triple is recorded (308) in a semantic CRM triple store (136) in computer memory (168).

The semantic CRM triple store (136) is composed of data structured in triples of the description logic that describes customers, products, services, and other information pertinent to CRM. The call notes triple store (138) is composed of structured descriptions of words that are special to call notes as such, where each structured description in the call notes triple store is composed of a triple of the description logic. Both triple stores (136, 138) in embodiments can be stored in contiguous memory, either in a same segment of contiguous memory or in separate segments of contiguous memory. The call notes triple store (138) in this example is shown as a component, a subgraph, of the semantic CRM triple store (136), which as we know either is or can be in turn a component or subgraph of an enterprise knowledge graph (154 on FIG. 1). In the example of FIG. 9, searching the semantic CRM triple store also searches the call notes triple store, and determining whether a parsed triple is recorded in the semantic CRM triple store also determines whether the parsed triple is recorded in the call notes triple store.

If the parsed triple is not recorded (308) in the semantic CRM triple store (136), then a call center application (195) records (322) the parsed triple in the jargon triple store (325). In embodiments in which parsing (304) is carried out server-side, the call center application (195) can be a triple server application (297 on FIG. 6). In embodiments in which parsing is carried out client-side, the call center application (195) can be a dashboard (110 on FIGS. 1 and 3). Some embodiments allow the semantic query engine (298) to do the recording (322). Either way, after recording (322), the method loops (312) back to parse (304) the next word (509) in the call notes (366). If the parsed triple is already stored (310) in semantic CRM triple store (136), then the method loops (312) directly back to parsing (304) a next word (509) without recording (322).

Figure 10:
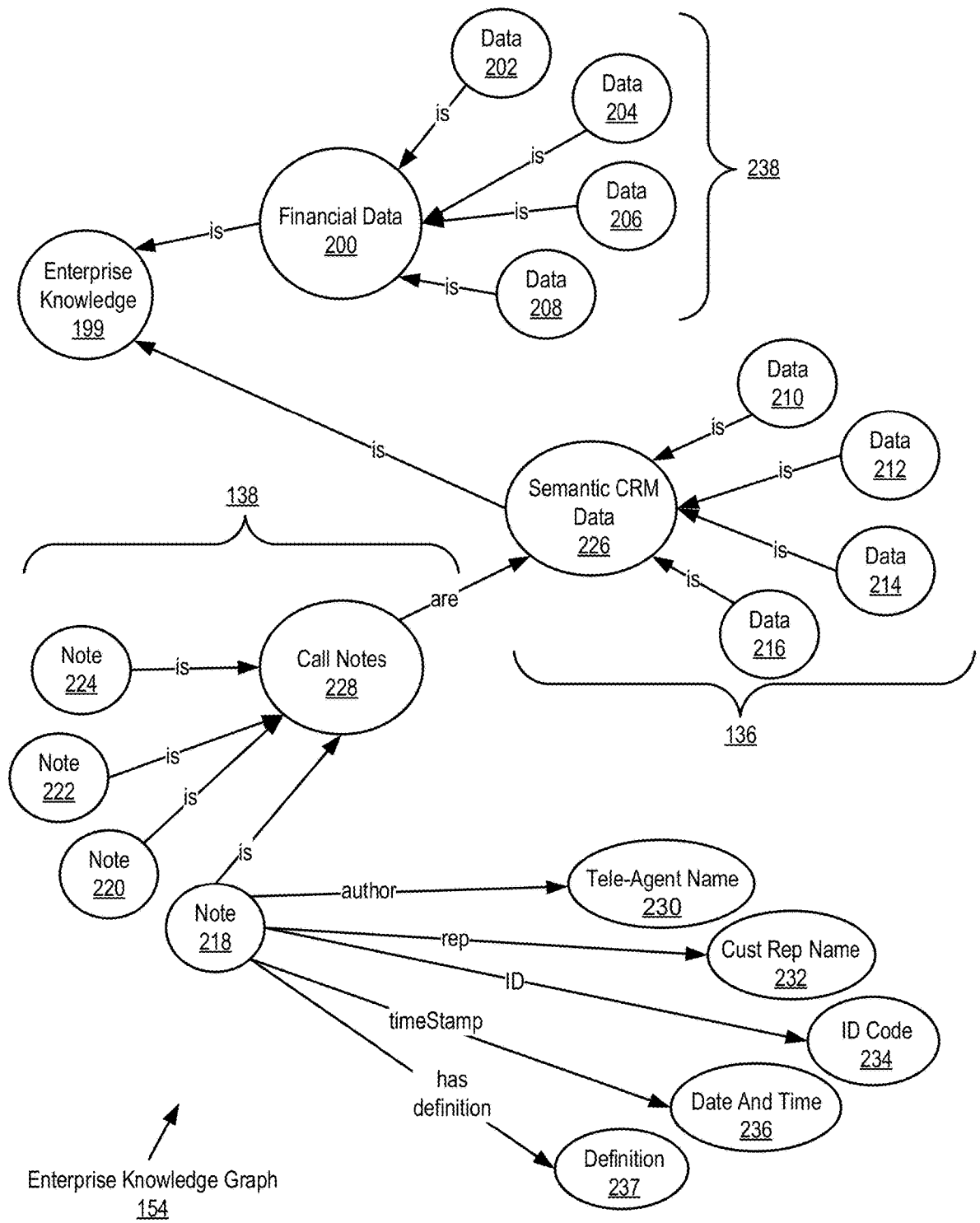
FIG. 10 sets forth an example enterprise knowledge graph in which a semantic CRM triple store and a call notes triple store are implemented as subgraphs.

For further explanation, FIG. 10 sets forth an example enterprise knowledge graph (154) in which a semantic CRM triple store (136) and a call notes triple store (138) are implemented as logically-connected segments, that is, subgraphs, of the overall knowledge graph. All the nodes and edges in the example graph (154) of FIG. 10 are elements of semantic triples. The example graph (154) includes a financial subgraph (238) as a reminder that typical enterprise knowledge graphs include much more than CRM data or call notes. They also will typically include financials, vendor information, business entities and structures, project information, corporate guidelines and manuals, employee data, incorporation data, transactions, contracts, sales histories, research details, and so on, and so on.

The root of the graph (154) is a class object named Enterprise Knowledge (199). The nodes Financial Data (200) and Semantic CRM Data (226) are subclasses of Enterprise Knowledge, and Call Notes (228) is a subclass of Semantic CRM Data (226). The individual call note nodes (218, 220, 222, 224) each contains at least one word from a tele-agent conversation that has been parsed into a semantic triple, or it should be said, parsed into at least one semantic triple. The example of FIG. 10 also illustrates the fact that the parsing process can and will often result in multiple triples for each call note. Call note (218), for example, is a subject of six triples in this example: one triple designates that subject (218) is a call note (228), one provides the name (218) of the tele-agent who authored the call note, one records the name (232) of the customer representative whose conversation generated the call note, one records an identification code (234) for the call note, one provides a time stamp (236) for the call note, and one provides a definition (237) for at least one of the words in the call note.

Queries against a triple store in a graph like graph (154) can include a clause specifying a subgraph:

```
Query:
    SELECT      ?subject
    WHERE       { ?subject :is :Call Note .
                  ?subject :ID :ID Code(234) . }
    Response: :Note(218)
```

Figure 11:
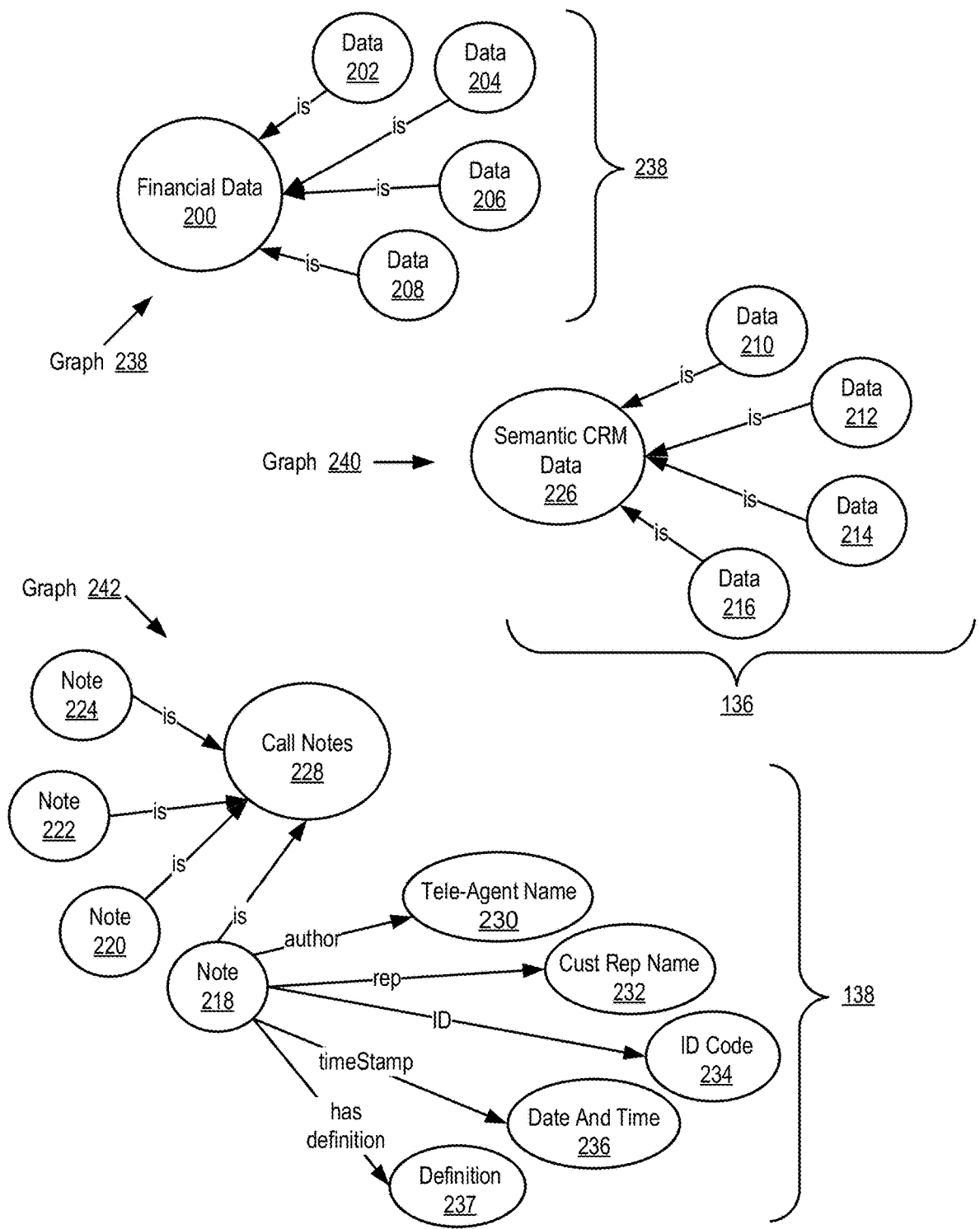
FIG. 11 sets forth an example set of triple stores in which a semantic CRM triple store, a call notes triple store, and a financial triple store are implemented as separate graphs.

For further explanation, FIG. 11 sets forth an example set of triple stores in which a semantic CRM triple store (136), a call notes triple store (138), and a financial triple store (238) are implemented as separate graphs, (240, 242, 238) respectively. The financial triple store (238) is provided as a reminder that an enterprise knowledge base will include more than CRM data and call notes. The three independent graphs as well as additional such graphs can still implement elements of an overall enterprise knowledge base, except that the administrative processes for such a knowledge base may vary, because at least some of its semantic data is housed in separate graphs. Queries, for example, may be structured differently. Queries against a call notes triple store in a graph like graph (242) may not need a clause specifying any particular subgraph:

```
Query:
    SELECT      ?subject
    WHERE       {?subject :ID :ID Code(234) . }
    Response: :Note(218)
```

Figure 12:
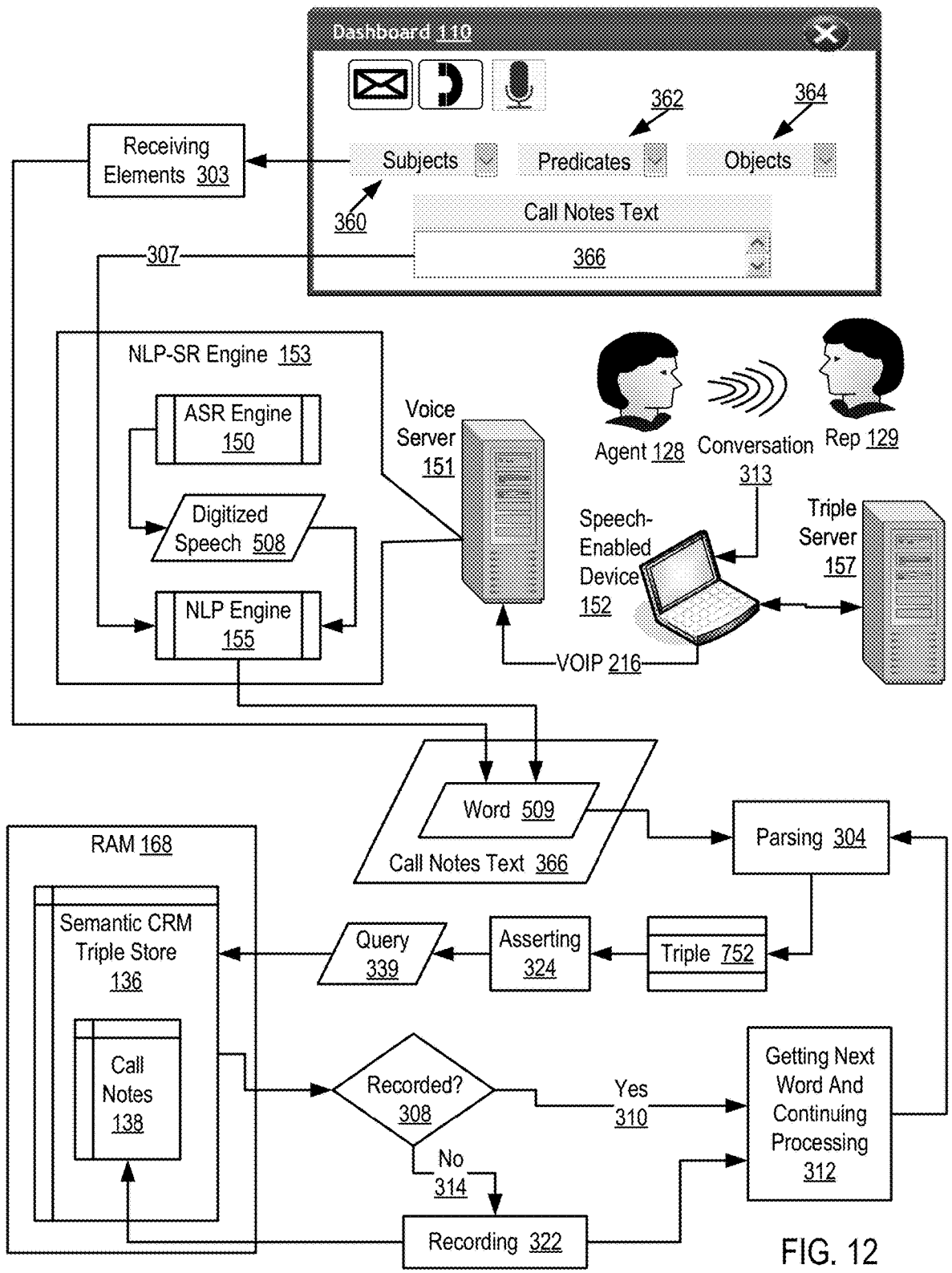
FIGS. 12, 13, and 14 set forth flow charts illustrating further example methods of CRM according to embodiments of the present invention.

For further explanation, FIG. 12 sets forth a flow chart illustrating a further example method of CRM according to embodiments of the present invention. The method of FIG. 12 is similar to the example method of FIG. 9, including as it does parsing (304) a word (509) of call notes (366) into a triple (752) of a description logic (306), determining whether the parsed triple is recorded (308) in a semantic CRM triple store (136) or a call notes triple store (138), recording (322) a parsed triple in the call notes triple store (138), and looping (312) back to parsing (304) a next word (509).

In addition to its similarities to the method of FIG. 9, the method of FIG. 12 includes three alternative ways of acquiring words for parsing into semantic triples. In a first alternative way of providing a digitized word to the parsing process, in the method of FIG. 12, parsing (304) can be carried out by parsing a word (509) of digitized speech recognized by a natural language processing speech recognition ("NLP-SR") engine (153) from the conversation (313) between a tele-agent (128) and a customer representative (129). That is, the method of FIG. 12 includes recognizing, by a natural language processing speech recognition ("NLP-SR") engine into digitized speech, speech from such a conversation. In this example method, recognizing speech from such a conversation is carried out as follows. Words of speech from the conversation (313) travel through a microphone and amplifier on a speech-enabled device (152) and a VOIP connection (216) to a voice server (151) where an speech recognition engine (150) recognizes the words into a stream of digitized speech (508) which is handed off to a natural language processing engine (155) which processes the digitized speech into sentences and parts of speech and passes the words so processed (509) to the parsing process (304) where they are parsed into triples (752). This is a first alternative way of providing a digitized word (509) to the parsing process (304).

In a second alternative way of providing a digitized word to the parsing process, the method of FIG. 12 also includes receiving (307) in a natural language processing engine a word of call notes from a text box widget (366) of a CRM dashboard (110). The tele-agent, rather than speaking call notes, types call notes into a GUI text box (366), and all the text so typed is provided by the dashboard (110) as digitized words directly to a natural language processing engine (155). The natural language processing engine sees no difference between typed words (366, 307) and the words in the stream of digitized speech (508). Thus, this second alternative is similar to the first alternative with the exception that there is no need for speech recognition (150), because when a stream of digitized text arrives in the NLP-SR engine (153), the words in the stream are already digitized by typing in through the GUI widget text box (366). The natural language processing engine (155) works the same way as in the first alternative, processing the digitized text from the text box (366) into sentences and parts of speech and passing the words so processed (509) to the parsing process (304) where they are parsed into triples (752). This is a second alternative way of providing a digitized word (509) to the parsing process (304).

In a third alternative way of providing a digitized word to the parsing process, method of FIG. 12 also includes receiving (303) into the parsing process (304) a word (509) designated as an element of a parsed triple through widgets (360, 362, 364) of a CRM dashboard (110). The widgets are pull-down menu listings of Subjects for triples (360), Predicates for triples (362), and Objects for triples. The Predicates (362) and Objects (364) are triple elements already defined in an ontology supportive of the semantic CRM triple store (136) and the call notes triple store (138). The Subjects (360) are a stream of word candidates for inclusion in triples. Words in the Subjects pull-down menu (360) are provided by the NLP-SR engine (153) from call notes text (366) or from words recognized from the conversation (313). The tele-agent (128) passes a word (509) to the parsing process (304) by selecting a word from the Subjects pull-down menu (360), for example, selecting by keyboard or mouse. The tele-agent can optionally also select a Predicate (362) or an Object (364) for inclusion in the same triple with the selected Subject. The tele-agent's selections of predicates and objects in some embodiments can be binding upon the parser (304). In other embodiments, the tele-agent's selections are treated by the parser merely as recommendations. The parsing process optionally accepts the tele-agent's selections of predicates and objects, or the parsing process makes its own selections of predicates and triples for inclusion with the word (509) in at least one parsed triple (752). This is a third alternative way of providing a digitized word (509) to the parsing process (304).

In the method of FIG. 12, determining (308) whether the parsed triple (752) is recorded in a semantic CRM triple store (136) or in a call notes triple store (138) is carried out by first asserting (324) against the semantic CRM triple store (136) a query (339) comprising the parsed triple (304). Such a query (339) asks only whether the parsed triple is presently recorded in a triple store. Such a query does not ask for definitions, inferences, or other information. Such a query is a semantic query that take a form similar to the data it queries. Take for example the connected triples describing Bob and the Mona Lisa, again expressed here in an abstract syntax, this time with (subject predicate object) separated by spaces:

(Bob isA person)
(Bob isAFriendOf Alice)
(Bob isBornOn "the 4$^{th}$ of July 1990")
(Bob isInterestedIn "the Mona Lisa")
("the Mona Lisa" wasCreatedBy "Leonardo da Vinci")
("the video 'La Joconde à Washington'" isAbout "the Mona Lisa")

In an example where the parsed triple (304) asserts (Bob isAFriendOf Mike), then this query:
ASK {:Bob :isAFriendOF :Mike .}
returns "No." The ASK syntax is fashioned after SPARQL and Turtle, and it reports only success or failure in matching the query, nothing else. In an example where the parsed triple asserts (Bob isAFriendOf Alice), then this query:
ASK {:Bob :isAFriendOF :Alice .}
returns "Yes." Thus, the pertinent query here (339) asks only whether the parsed triple (752) is presently recorded in one of the triple stores (136, 138).

Figure 13:
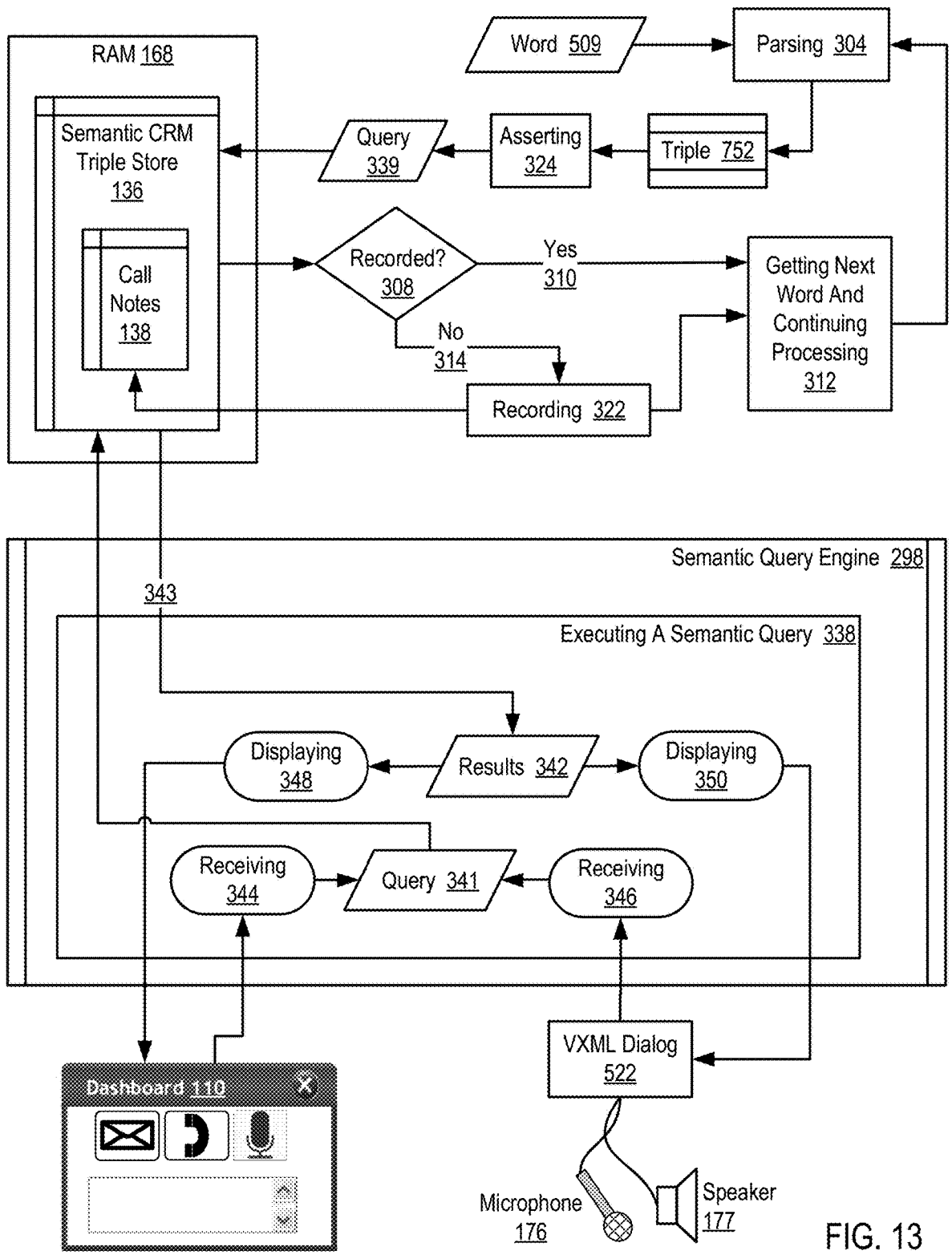

For further explanation, FIG. 13 sets forth a flow chart illustrating a further example method of CRM according to embodiments of the present invention. In particular, the method of FIG. 13 includes executing (338) by a query engine (298) of a computer system against a semantic CRM triple store (136) a semantic query (341) for a definition of a word recorded in the semantic CRM triple store. The method of FIG. 13 also includes displaying (348, 350) results (342) of the semantic query (341). Words defined in call notes (138) are also defined in the semantic CRM triple store, so a query against the semantic CRM triple store is also a query against the call notes triple store. The definition so sought is in a semantic triple defining a word like word (509) previously parsed and inserted or recorded in the semantic CRM triple store (136) generally or in the call note triple store (138) in particular.

The method of FIG. 13 is similar to the example method of FIG. 9, including as it does parsing (304) a word (509) of call notes into a triple (752) of a description logic (306), determining whether the parsed triple is recorded (308) in a semantic CRM triple store (136) or a call notes triple store (138), recording (322) a parsed triple in the call notes triple store (138), and looping (312) back to parsing (304) a next word (509). The method of FIG. 13 differs from that of FIG. 9 by including a query, not only to determine whether a triple is in a store (339), but another type of query (341) that retrieves contents of a triple store. The method of FIG. 13 includes executing (338) by a query engine (298) against the semantic CRM triple store (136) a semantic query (341) for information from triples recorded in the semantic CRM triple store including the call notes triple store (138). The semantic query is, for example, received (344) in the query engine through an element of a graphical user interface such a dashboard (110)—or, for a further example, through a speech-enabled user interface such as a microphone (176) and VoiceXML dialog (522). The query engine (298) retrieves (343) and displays (348, 350) the results (342) of the semantic query (342) either back through the element of the graphical user interface (110) or through the speech-enabled user interface (522, 177).

Query (341) is described here as being asserted against the semantic CRM triple store (136) even though the information sought is recorded in the call notes triple store (138). In this example, the query (341) against the semantic CRM triple store (136) is also effectively a query against the call notes triple store (138) because the call notes triple store (138) is a component, a subgraph, of the semantic CRM triple store (136). In embodiments in which the semantic CRM triple store (136) and the call notes triple store (138) are implemented in separate graphs, then two such queries may be needed to retrieve sought information. A word (509) processed according to the method of FIG. 13 is a word in call notes, spoken, typed into a text box, or mouse-clicked from widgets of a GUI. Such call notes are notes from a conversation between a tele-agent and a customer representation, that is, such notes are aspects of CRM. Information in a semantic CRM triple store therefore is so closely related to information in a call notes triple store (138) that recording that information in call notes when it is already in a CRM store would be redundant. Searching exclusively in call notes might miss information known to have been discussed in a conversation between a tele-agent and a customer representative, information nevertheless previously stored in CRM data, not in call note triples as such.

Query (341) is different from the query (339) discussed earlier. Query (341) does not ask merely whether data is in a store, query (341) asks for the data itself to be returned. Thus, again with reference to Bob and the Mona Lisa, this query, which requests predicates and objects from all triples in which Bob is the subject:

| SELECT | ?predicate ?object |
|---|---|
| WHERE | { :Bob :?predicate :?subject .} |
| returns this: | |
| :isA | :person |
| :isAFriendOf | :Alice |
| :isBornOn | :"the 4$^{th}$ of July 1990" |
| :isInterestedIn | :"the Mona Lisa") |
| This query: | |
| SELECT | ?predicate ?object |
| WHERE | { :"the Mona Lisa" :?predicate :?subject .} |
| returns this: | |
| :wasCreatedBy | :"Leonardo da Vinci" |
| And this query: | |
| SELECT | ?subject ?predicate ?object |
| WHERE | { :?subject :?predicate :?"the Mona Lisa" .} |
| returns this: | |
| :"the video 'La Joconde à Washington'" | :isAbout :"the Mona Lisa" |

Figure 14:
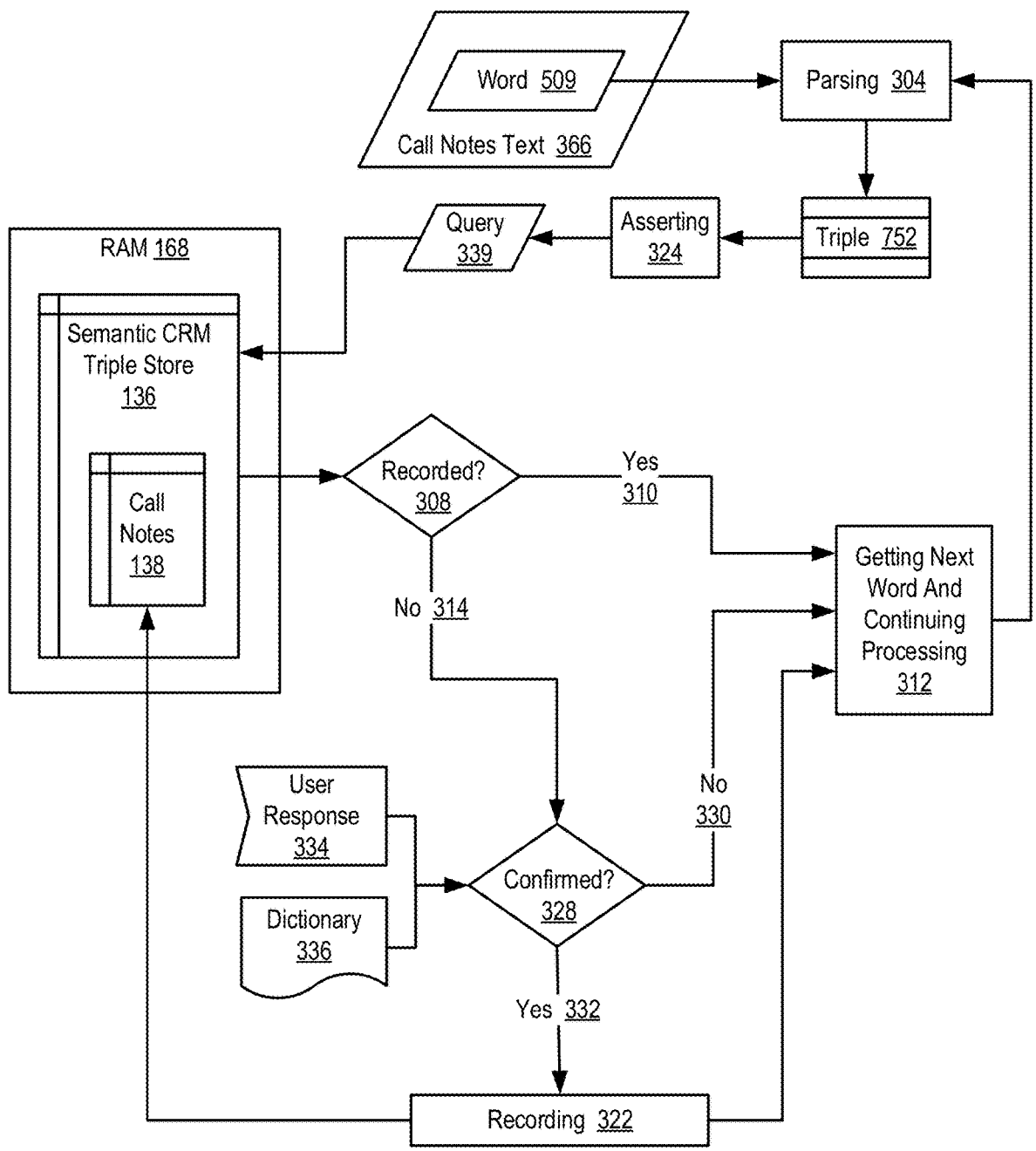

For further explanation, FIG. 14 sets forth a flow chart illustrating a further example method of CRM according to embodiments of the present invention. The method of FIG. 14 is similar to the example method of FIG. 9, including as it does parsing (304) a word (509) of call notes into a triple (752) of a description logic (306), determining whether the parsed triple is recorded (308) in a semantic CRM triple store (136) or a call notes triple store (138), recording (322) a parsed triple in the call notes triple store (138), and looping (312) back to parsing (304) a next word (509).

The method of FIG. 14 differs from that of FIG. 9 by including an additional confirmation (328) that a parsed triple (752) actually is to be recorded in a call notes triple store (138). In the example of FIG. 14, a parsed triple (752) has been determined not recorded (314) in a semantic CRM triple store (and therefore also not recorded in the pertinent call notes triple store). Before recording (322) the parsed triple in the call notes triple store (138), the method of FIG. 14 confirms (328) that the parsed triple should be recorded in the call notes triple store. If the parsed triple fails confirmation (330), the method proceeds by looping (312) back to parsing (304) the next word (509) of call notes (366).

Consider a use case in which a user who is a tele-agent in a call center discusses with a customer a prospective sale of residential construction materials. When instructed to do so, through, for example, a VoiceXML dialog, an NLP-SR engine provides as digitized speech words organized in sentences and identified as parts of speech. The parsing process then can, for example, take the subject, the verb, and a direct object from a sentence and parse them into a triple with a subject, predicate, and object. From this sentence, for example, "Doors are construction materials," the parser can produce (door isA constructionMateral), and pass that triple along to the rest of the process as a candidate parsed triple (752) for inclusion in the jargon store (325). But these assertions regarding doors are more difficult:

A door is a gateway in time.
Doors are a rock band.
A door is a figure of speech in The Doors Of Perception by Aldous Huxley.

It is hard to tell why such results might be found in call notes about residential construction. Perhaps the speech engine made a mistake. Perhaps the tele-agent and the customer representative wandered off topic. All of which makes little difference. The point is that the parser will produce triples from these words that are not pertinent to residential construction. Such triples are likely to be in neither a semantic CRM triple store nor in a call notes triple store. In which case, not being found (314) in the pertinent triple store or stores, such triples become candidates for inclusion in the call notes triple store despite the fact that such triples do not really belong in the call notes triple store.

The confirmation process (328) can query a technical dictionary (336) of construction terms. The technical dictionary is unstructured text, no semantics, no triples, but it does contain searchable definitions. If "gateway in time," "rock band," or "The Doors Of Perception" do not appear in definitions of doors, the confirmation process can conclude that certain triples do not belong (330) in the jargon triple store (325) and loop (312) to continue processing. The confirmation process (328) can query a user (334), through, for example, a GUI interface or a speech interface, present a candidate parsed triple, and ask whether to add it to the call notes triple store. If the user confirms (332), the process records (322) and loops (312). If the user does not confirm (330), the process loops (312) without recording (322).

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of customer relationship management ("CRM") implemented in a computer system, the method comprising:
   generating, by a natural language processing ("NLP") engine by a parsing process and in dependence upon a grammar, digitized words from call notes of a tele-agent of a call center;
   identifying from the digitized words, a plurality of word candidates for inclusion in a triple, the triple including a subject, a predicate, and an object;
   presenting, on a user-interface of the NLP engine, a list of the identified words selectable as a subject for a triple;
   receiving, through the user-interface, information indicative of user-selection of a word from the list of the identified words;
   generating, by the NLP engine via the parsing process, the triple by associating a particular predicate and a particular object with the word;
   storing the triple as a call note in a semantic CRM triple store.

2. The method of claim 1 wherein the semantic CRM triple store comprises a set of triples of description logic comprising knowledge regarding the customer that is available to the tele-agent through the computer system.

3. The method of claim 1 wherein further comprising:
   determining whether the triple is recorded in the semantic CRM triple store by asserting against the semantic CRM triple store a query comprising the triple.

4. The method of claim 1 further comprising:
   executing by a query engine of the computer system against the semantic CRM triple store a semantic query for a definition of a word recorded in the semantic CRM triple store; and
   displaying results of the semantic query.

5. A computer system that implements customer relationship management ("CRM"), the computer system comprising a computer processor operatively coupled to computer memory, the computer processor configured to function by:
   generating, by a natural language processing ("NLP") engine by a parsing process and in dependence upon a grammar, digitized words from call notes of a tele-agent of a call center;
   identifying from the digitized words, a plurality of word candidates for inclusion in a triple, the triple including a subject, a predicate, and an object;
   presenting, on a user-interface of the NLP engine, a list of the identified words selectable as a subject for a triple;
   receiving, through the user-interface, information indicative of user-selection of a word from the list of the identified words;
   generating, by the NLP engine via the parsing process, the triple by associating a particular predicate and a particular object with the word;
   storing the triple as a call note in a semantic CRM triple store.

6. The computer system of claim 5 wherein the semantic CRM triple store comprises a set of triples of description logic comprising knowledge regarding the customer that is available to the tele-agent through the computer system.

7. The computer system of claim 5 further configured to determine whether the triple is recorded in the semantic CRM triple store by asserting against the semantic CRM triple store a query comprising the triple.

8. The computer system of 5 wherein the computer processor is further configured to:
   execute by a query engine of the computer system against the semantic CRM triple store a semantic query for a definition of a word recorded in the semantic CRM triple store; and
   display results of the semantic query.

9. The method of claim 1, wherein generating the triple further comprises:
   receiving a second user-selection associated with at least one of: the particular predicate or the particular object; and
   generating the triple based at least on the second user-selection.

* * * * *

UNITED STATES PATENT AND TRADEMARK OFFICE
CERTIFICATE OF CORRECTION

| | | |
|---|---|---|
| PATENT NO. | : 11,468,882 B2 | Page 1 of 1 |
| APPLICATION NO. | : 16/154718 | |
| DATED | : October 11, 2022 | |
| INVENTOR(S) | : Shannon L. Copeland | |

It is certified that error appears in the above-identified patent and that said Letters Patent is hereby corrected as shown below:

In the Claims

In Claim 3, Column 25, Line 33, after "1" delete "wherein".

In Claim 8, Column 26, Line 29, after "of" insert -- claim --.

Signed and Sealed this
Twenty-ninth Day of November, 2022

*Katherine Kelly Vidal*

Katherine Kelly Vidal
*Director of the United States Patent and Trademark Office*